United States Patent
Ewing et al.

(10) Patent No.: US 12,437,262 B2
(45) Date of Patent: Oct. 7, 2025

(54) ANTI-SWEEPING HOOK WITH INTEGRATED INVENTORY MONITORING AND/OR LOSS PREVENTION FUNCTIONALITY

(71) Applicants: Brent O. Ewing, Roscoe, IL (US); Chan Chor Man, Hong Kong (HK); Yun Hua, Solon, OH (US); Jeffrey A. Comstock, Edgerton, WI (US)

(72) Inventors: Brent O. Ewing, Roscoe, IL (US); Chan Chor Man, Hong Kong (HK); Yun Hua, Solon, OH (US); Jeffrey A. Comstock, Edgerton, WI (US)

(73) Assignee: Fasteners for Retail, Inc., Twinsburg, OH (US)

( * ) Notice: Subject to any disclaimer, the term of this patent is extended or adjusted under 35 U.S.C. 154(b) by 352 days.

(21) Appl. No.: 18/114,006

(22) Filed: Feb. 24, 2023

(65) Prior Publication Data
US 2023/0252411 A1    Aug. 10, 2023

Related U.S. Application Data

(63) Continuation-in-part of application No. 17/887,655, filed on Aug. 15, 2022.
(Continued)

(51) Int. Cl.
*G06Q 10/087*    (2023.01)
*A47F 5/08*    (2006.01)
(Continued)

(52) U.S. Cl.
CPC ......... *G06Q 10/087* (2013.01); *A47F 5/0869* (2013.01); *G06K 7/10366* (2013.01); *G06K 7/1413* (2013.01); *G06K 7/1417* (2013.01)

(58) Field of Classification Search
CPC ...... A47F 1/128; A47F 5/0861; A47F 5/0869; A47F 2010/025; G06Q 10/087; G06K 7/10366; G06K 7/1413; G06K 7/1417
See application file for complete search history.

(56) References Cited

U.S. PATENT DOCUMENTS

| 1,922,989 | A | 8/1933 | Terry |
| 2,358,658 | A | 9/1944 | Riche et al. |

(Continued)

FOREIGN PATENT DOCUMENTS

| CA | 3054574 A1 | 8/2018 |
| CN | 102124178 A | 7/2011 |

(Continued)

OTHER PUBLICATIONS

POS Tuning—für mehr Erfolg am Point of Sale: POS T-Product Pusher; http://www.postuing.de/69.0.html?&L=2; website; Mar. 29, 2006; 1 page.
(Continued)

*Primary Examiner* — Stanton L Krycinski
(74) *Attorney, Agent, or Firm* — Reinhart Boerner Van Deuren P.C.

(57) ABSTRACT

Anti-sweeping hook with a display hook, a helical coil, and rotating handle. The display hook may be straight with a first end and second end opposite the first end. The helical coil is disposed about the display hook and extends lengthwise along the display hook. The helical coil has a first coil end proximate the first end of the display hook. Rotation of the helical coil in a first direction loads the retail merchandise onto the display hook. Rotation of the coil in a second direction opposite the first direction removes the retail merchandise. The rotating handle is configured to determine a number of retail items stored on the display hook, based on the number and direction of rotation of the rotating handle. The rotating handle includes an MCU and wireless commu-
(Continued)

nications module to process and wirelessly transmit inventory data indicating the number of retail items on the display hook.

40 Claims, 25 Drawing Sheets

Related U.S. Application Data

(60) Provisional application No. 63/236,097, filed on Aug. 23, 2021.

(51) Int. Cl.
*G06K 7/10* (2006.01)
*G06K 7/14* (2006.01)

(56) References Cited

U.S. PATENT DOCUMENTS

| | | | |
|---|---|---|---|
| 2,398,411 A | 4/1946 | Cook |
| 2,954,128 A | 9/1960 | Gordon |
| 2,996,593 A | 8/1961 | McMains |
| 3,248,005 A | 4/1966 | Joschko |
| 3,550,121 A | 12/1970 | Porter, Jr. |
| 3,572,546 A | 3/1971 | Schlaf |
| 3,706,309 A | 12/1972 | Toftness |
| 3,773,217 A | 11/1973 | Schlaf |
| 3,848,745 A | 11/1974 | Smith |
| 3,852,735 A | 12/1974 | Matsuda et al. |
| 3,983,341 A | 9/1976 | Stanish |
| 4,001,805 A | 1/1977 | Golbe |
| 4,020,305 A | 4/1977 | Schwartz |
| 4,021,796 A | 5/1977 | Fawcett, Jr. et al. |
| 4,122,437 A | 10/1978 | Petersen |
| 4,166,273 A | 8/1979 | Riley, Jr. et al. |
| 4,227,188 A | 10/1980 | Petersen |
| 4,269,025 A | 5/1981 | Kondo |
| 4,289,242 A | 9/1981 | Kenyon |
| 4,311,889 A | 1/1982 | Blanchard et al. |
| 4,312,460 A | 1/1982 | Boettcher |
| 4,352,170 A | 9/1982 | Jetter |
| 4,352,171 A | 9/1982 | Jetter |
| 4,370,069 A | 1/1983 | Nomura |
| 4,383,242 A | 5/1983 | Sassover et al. |
| 4,384,906 A | 5/1983 | Molinari et al. |
| 4,462,023 A | 7/1984 | Nielsen et al. |
| 4,470,236 A | 9/1984 | MacDonald, Jr. |
| 4,475,658 A | 10/1984 | Roberts |
| 4,566,598 A | 1/1986 | Fors |
| 4,600,119 A | 7/1986 | Olson |
| 4,638,922 A | 1/1987 | Stoltz |
| 4,675,654 A | 6/1987 | Copeland |
| 4,706,821 A | 11/1987 | Kohls et al. |
| 4,712,694 A | 12/1987 | Breslow |
| 4,718,626 A | 1/1988 | Thalenfeld et al. |
| 4,742,923 A | 5/1988 | Calvert |
| 4,821,894 A | 4/1989 | Dechirot |
| D300,994 S | 5/1989 | Wolff |
| 4,830,201 A | 5/1989 | Breslow |
| 4,836,390 A | 6/1989 | Polvere |
| 4,870,228 A | 9/1989 | Speer et al. |
| 4,887,737 A | 12/1989 | Adenau |
| 4,899,668 A | 2/1990 | Valiulis |
| 4,901,869 A | 2/1990 | Hawkinson et al. |
| 4,942,386 A | 7/1990 | Willis |
| 4,944,414 A | 7/1990 | Albright |
| 4,962,367 A | 10/1990 | Tymn |
| 4,967,044 A | 10/1990 | Speer et al. |
| 4,996,515 A | 2/1991 | Schaffer et al. |
| 5,009,334 A | 4/1991 | Bodkins |
| 5,068,643 A | 11/1991 | Yashina |
| 5,070,986 A | 12/1991 | Hoffman et al. |
| 5,083,638 A | 1/1992 | Schneider |
| 5,086,641 A | 2/1992 | Roselli |
| 5,114,021 A | 5/1992 | Fredrickson |
| 5,161,704 A | 11/1992 | Valiulis |
| 5,168,263 A | 12/1992 | Drucker |
| 5,222,608 A | 6/1993 | Eklof et al. |
| 5,240,126 A | 8/1993 | Foster et al. |
| 5,255,182 A | 10/1993 | Adams |
| 5,265,738 A | 11/1993 | Yablans et al. |
| 5,307,941 A | 5/1994 | Siegal |
| 5,317,304 A | 5/1994 | Choi |
| 5,335,892 A | 8/1994 | Busch |
| 5,397,856 A | 3/1995 | Lee |
| 5,434,559 A | 7/1995 | Smiley et al. |
| 5,469,135 A | 11/1995 | Solow |
| 5,570,080 A | 10/1996 | Inoue et al. |
| 5,610,337 A | 3/1997 | Nelson |
| 5,641,077 A | 6/1997 | Tufano et al. |
| 5,649,641 A | 7/1997 | Campoli |
| 5,671,851 A | 9/1997 | Johnson et al. |
| 5,685,664 A | 11/1997 | Parham et al. |
| 5,690,238 A | 11/1997 | Schmehr |
| 5,730,320 A | 3/1998 | David |
| 5,748,082 A | 5/1998 | Payne |
| 5,757,270 A | 5/1998 | Mori |
| 5,815,066 A | 9/1998 | Pumilia |
| 5,838,225 A | 11/1998 | Todd |
| 5,839,588 A | 11/1998 | Hawkinson |
| 5,855,282 A | 1/1999 | Hardy |
| 5,905,438 A | 5/1999 | Weiss et al. |
| 5,906,283 A | 5/1999 | Kump et al. |
| 5,955,951 A | 9/1999 | Wischerop et al. |
| 5,965,954 A | 10/1999 | Johnson et al. |
| 5,971,173 A | 10/1999 | Valiulis et al. |
| 5,977,654 A | 11/1999 | Johnson et al. |
| 5,979,674 A | 11/1999 | Thalenfeld |
| 5,995,003 A | 11/1999 | Rogers |
| 6,041,720 A | 3/2000 | Hardy |
| 6,049,268 A | 4/2000 | Flick |
| 6,082,558 A | 7/2000 | Battaglia |
| 6,102,192 A | 8/2000 | Tomuro et al. |
| 6,105,791 A | 8/2000 | Chalson et al. |
| 6,109,458 A | 8/2000 | Walsh et al. |
| 6,129,218 A | 10/2000 | Henry et al. |
| 6,131,748 A | 10/2000 | Kawasaki et al. |
| 6,133,830 A | 10/2000 | D'Angelo et al. |
| 6,158,598 A | 12/2000 | Josefsson |
| 6,269,285 B1 | 7/2001 | Mignault |
| 6,279,256 B1 | 8/2001 | Norolof et al. |
| 6,286,690 B1 | 9/2001 | Thalenfeld |
| 6,373,381 B2 | 4/2002 | Wu |
| 6,409,028 B2 | 6/2002 | Nickerson |
| 6,418,797 B1 | 7/2002 | Ambrosina et al. |
| 6,474,478 B1 | 11/2002 | Huehner et al. |
| 6,517,000 B1 | 2/2003 | McAllister et al. |
| D472,331 S | 3/2003 | Zadak |
| 6,539,280 B1 | 3/2003 | Valiulis et al. |
| 6,628,344 B1 | 9/2003 | Weber |
| D480,231 S | 10/2003 | Valiulis et al. |
| 6,659,291 B2 | 12/2003 | Huehner et al. |
| 6,690,411 B2 | 2/2004 | Naidoo et al. |
| 6,769,552 B1 | 8/2004 | Thalenfeld |
| 6,820,754 B2 | 11/2004 | Ondrasik |
| 6,824,009 B2 | 11/2004 | Hardy |
| 6,874,684 B1 | 4/2005 | Denenberg et al. |
| 6,886,699 B2 | 5/2005 | Johnson et al. |
| 6,889,854 B2 | 5/2005 | Burke |
| 6,923,330 B1 | 8/2005 | Nagel |
| 6,964,235 B2 | 11/2005 | Hardy |
| 6,967,578 B1 | 11/2005 | Guida |
| 7,007,810 B2 | 3/2006 | Huehner et al. |
| 7,017,778 B2 | 3/2006 | Halbherr |
| 7,018,180 B2 | 3/2006 | Koo |
| 7,059,518 B2 | 6/2006 | Forster |
| 7,137,513 B2 | 11/2006 | Sedon et al. |
| 7,174,176 B1 | 2/2007 | Liu |
| 7,178,678 B2 | 2/2007 | Mansfield et al. |
| 7,202,784 B1 | 4/2007 | Herwig |
| 7,210,164 B1 | 4/2007 | Jandrell |
| 7,258,461 B1 | 8/2007 | Izardel |
| 7,287,669 B2 | 10/2007 | Takeda |

(56) References Cited

U.S. PATENT DOCUMENTS

| | | |
|---|---|---|
| 7,293,663 B2 | 11/2007 | Lavery, Jr. |
| 7,347,335 B2 | 3/2008 | Rankin, VI et al. |
| 7,377,402 B2 | 5/2008 | Takeda |
| 7,395,938 B2 | 7/2008 | Merit et al. |
| 7,530,188 B2 | 5/2009 | Beilenhoff et al. |
| 7,533,784 B2 | 5/2009 | Vlastakis et al. |
| 7,559,437 B2 | 7/2009 | Colelli et al. |
| 7,566,037 B2 | 7/2009 | Vogler |
| 7,584,930 B2 | 9/2009 | Zich |
| 7,591,422 B2 | 9/2009 | Maitin |
| 7,591,442 B2 | 9/2009 | Dinh et al. |
| 7,671,741 B2 | 3/2010 | Lax et al. |
| 7,671,742 B2 | 3/2010 | Fallin et al. |
| 7,749,121 B2 | 7/2010 | Perng |
| 7,768,399 B2 | 8/2010 | Hachmann et al. |
| 7,792,711 B2 | 9/2010 | Swafford, Jr. et al. |
| 7,828,158 B2 | 11/2010 | Colelli et al. |
| 7,905,364 B2 | 3/2011 | Pail |
| 7,916,020 B2 | 3/2011 | Seidel |
| 7,969,305 B2 | 6/2011 | Belden, Jr. et al. |
| 8,016,128 B2 | 9/2011 | Valiulis et al. |
| 8,069,994 B2 | 12/2011 | Barkdoll |
| 8,103,047 B1 | 1/2012 | Griess et al. |
| 8,139,945 B1 | 3/2012 | Amir et al. |
| 8,190,289 B2 | 5/2012 | Lockwood et al. |
| 8,240,486 B2 | 8/2012 | Niederhuefner et al. |
| 8,260,456 B2 | 9/2012 | Siegel et al. |
| 8,274,391 B2 | 9/2012 | Yang |
| 8,276,766 B2 | 10/2012 | Rataiczak, III et al. |
| 8,328,027 B2 | 12/2012 | Barkdoll |
| 8,360,253 B2 | 1/2013 | Hardy |
| 8,368,542 B2 | 2/2013 | Yang |
| 8,373,564 B2 | 2/2013 | Wyatt, Jr. et al. |
| 8,378,826 B2 | 2/2013 | Mercier et al. |
| 8,386,075 B2 | 2/2013 | Lockwood et al. |
| 8,443,988 B2 | 5/2013 | Niederhuefner |
| 8,523,012 B2 * | 9/2013 | Richardson ............ A47F 5/0861 70/57.1 |
| 8,534,469 B2 | 9/2013 | Northrup, Jr. et al. |
| 8,629,772 B2 | 1/2014 | Valiulis et al. |
| 8,684,227 B2 * | 4/2014 | Richardson ............ A47F 5/0823 70/57.1 |
| 8,720,702 B2 | 5/2014 | Nagel |
| 8,803,687 B2 | 8/2014 | Valiulis et al. |
| 8,812,378 B2 | 8/2014 | Swafford, Jr. et al. |
| 8,823,521 B2 | 9/2014 | Overhultz et al. |
| 8,884,761 B2 | 11/2014 | Valiulis |
| 8,941,495 B2 | 1/2015 | Wiese et al. |
| 9,009,773 B1 | 4/2015 | Hendricks et al. |
| 9,129,494 B2 | 9/2015 | Valiulis et al. |
| 9,167,916 B2 | 10/2015 | Grant et al. |
| 9,241,583 B2 | 1/2016 | Nagel |
| 9,254,049 B2 | 2/2016 | Nagel |
| 9,318,007 B2 | 4/2016 | Valiulis et al. |
| 9,318,008 B2 | 4/2016 | Valiulis et al. |
| 9,324,220 B2 | 4/2016 | Valiulis |
| 9,437,736 B2 | 9/2016 | Taniguchi et al. |
| 9,483,896 B2 | 11/2016 | Lockwood et al. |
| 9,495,856 B2 | 11/2016 | Brenner |
| 9,576,417 B2 | 2/2017 | Christianson |
| 9,675,184 B2 * | 6/2017 | Xin ............ A47F 1/128 |
| 9,805,334 B2 | 10/2017 | Overhultz et al. |
| 9,805,539 B2 | 10/2017 | Swafford, Jr. et al. |
| 9,818,081 B2 | 11/2017 | Khalid et al. |
| 10,111,540 B2 * | 10/2018 | Brej ............ A47F 1/128 |
| 10,121,341 B2 | 11/2018 | Ewing et al. |
| 10,219,636 B2 * | 3/2019 | Berglund ............ A47F 5/0861 |
| 10,271,666 B2 | 4/2019 | Taylor et al. |
| 10,357,118 B2 | 7/2019 | Swafford |
| 10,535,216 B2 | 1/2020 | Swafford, Jr. et al. |
| 10,720,035 B2 | 7/2020 | Ewing et al. |
| 10,885,753 B2 | 1/2021 | Ewing et al. |
| 10,993,550 B2 | 5/2021 | Ewing et al. |
| 11,006,768 B2 * | 5/2021 | Berglund ............ A47F 5/0869 |
| 11,154,143 B2 | 10/2021 | Ewing et al. |
| 11,154,144 B2 * | 10/2021 | Bird ............ A47F 1/128 |
| 11,317,738 B2 | 5/2022 | Ewing et al. |
| 11,363,894 B2 | 6/2022 | Ewing et al. |
| 11,403,906 B2 * | 8/2022 | Hua ............ A47F 5/0823 |
| 11,412,863 B2 | 8/2022 | Grant et al. |
| 11,605,276 B2 | 3/2023 | Ewing et al. |
| 2001/0002210 A1 | 5/2001 | Petite |
| 2001/0004239 A1 | 6/2001 | Irizarry et al. |
| 2001/0044751 A1 | 11/2001 | Pugliese et al. |
| 2002/0004690 A1 | 1/2002 | Paulucci et al. |
| 2002/0067259 A1 | 6/2002 | Fufidio et al. |
| 2002/0108916 A1 | 8/2002 | Nickerson |
| 2002/0130776 A1 | 9/2002 | Houde |
| 2002/0188866 A1 | 12/2002 | Jalaludeen et al. |
| 2003/0004784 A1 | 1/2003 | Li et al. |
| 2003/0029816 A1 | 2/2003 | Huehner et al. |
| 2003/0030548 A1 | 2/2003 | Kovacs et al. |
| 2003/0057167 A1 | 3/2003 | Johnson et al. |
| 2003/0175004 A1 | 9/2003 | Garito et al. |
| 2003/0227382 A1 | 12/2003 | Breed |
| 2004/0034581 A1 | 2/2004 | Hill et al. |
| 2004/0053044 A1 | 3/2004 | Moreno et al. |
| 2004/0073334 A1 | 4/2004 | Terranova |
| 2004/0084386 A1 | 5/2004 | Huehner et al. |
| 2004/0124201 A1 | 7/2004 | Hieb |
| 2004/0145477 A1 | 7/2004 | Easter et al. |
| 2004/0195319 A1 | 10/2004 | Forster |
| 2005/0029283 A1 | 2/2005 | Pedigo |
| 2005/0040123 A1 | 2/2005 | Ali |
| 2005/0056602 A1 | 3/2005 | Hardy |
| 2005/0098626 A1 | 5/2005 | Jordan et al. |
| 2005/0104733 A1 | 5/2005 | Campero |
| 2005/0161420 A1 | 7/2005 | Hardy et al. |
| 2005/0168345 A1 | 8/2005 | Swafford, Jr. et al. |
| 2005/0189309 A1 | 9/2005 | Hardy |
| 2005/0189369 A1 | 9/2005 | Vlastakis et al. |
| 2005/0261816 A1 | 11/2005 | DiCroce et al. |
| 2005/0279722 A1 | 12/2005 | Ali |
| 2005/0288708 A1 | 12/2005 | Kammerer et al. |
| 2006/0049122 A1 | 3/2006 | Mueller et al. |
| 2006/0068144 A1 | 3/2006 | Mizuno et al. |
| 2006/0163180 A1 | 7/2006 | Rankin, VI et al. |
| 2006/0163272 A1 | 7/2006 | Gamble |
| 2006/0198611 A1 | 9/2006 | Park |
| 2006/0219517 A1 | 10/2006 | Cheng et al. |
| 2006/0226095 A1 | 10/2006 | Hardy |
| 2006/0240398 A1 | 10/2006 | Hardy et al. |
| 2007/0050271 A1 | 3/2007 | Ufford et al. |
| 2007/0080123 A1 | 4/2007 | Mason |
| 2007/0080806 A1 | 4/2007 | Lax et al. |
| 2007/0095903 A1 | 5/2007 | Suenbuel |
| 2007/0108142 A1 | 5/2007 | Medcalf et al. |
| 2007/0115100 A1 | 5/2007 | Mandie |
| 2007/0171059 A1 | 7/2007 | Pistilli |
| 2007/0251900 A1 | 11/2007 | Hardy |
| 2007/0265866 A1 | 11/2007 | Fehling |
| 2007/0267364 A1 | 11/2007 | Barkdoll |
| 2007/0267367 A1 | 11/2007 | Mueller et al. |
| 2007/0273513 A1 | 11/2007 | White |
| 2008/0015956 A1 | 1/2008 | Regard |
| 2008/0203253 A1 | 8/2008 | Vogler |
| 2008/0307687 A1 | 12/2008 | Nagel et al. |
| 2008/0309489 A1 | 12/2008 | Hachmann et al. |
| 2009/0006196 A1 | 1/2009 | Barkan et al. |
| 2009/0079557 A1 | 3/2009 | Miner |
| 2009/0091448 A1 | 4/2009 | Leyden et al. |
| 2009/0095695 A1 | 4/2009 | Moock et al. |
| 2009/0101606 A1 | 4/2009 | Olson |
| 2009/0109027 A1 | 4/2009 | Schuller |
| 2009/0174566 A1 | 7/2009 | Volk et al. |
| 2009/0248198 A1 | 10/2009 | Siegel et al. |
| 2009/0308494 A1 | 12/2009 | Linn |
| 2010/0012602 A1 | 1/2010 | Valiulis et al. |
| 2010/0013603 A1 | 1/2010 | Chatani et al. |
| 2010/0097223 A1 | 4/2010 | Kruest et al. |
| 2010/0175438 A1 | 7/2010 | Sankey |
| 2010/0200526 A1 | 8/2010 | Barkdoll |
| 2010/0237093 A1 | 9/2010 | Lockwood et al. |
| 2010/0238031 A1 | 9/2010 | Belden, Jr. et al. |

(56) References Cited

U.S. PATENT DOCUMENTS

| | | |
|---|---|---|
| 2010/0268792 A1 | 10/2010 | Butler et al. |
| 2011/0055103 A1 | 3/2011 | Swafford, Jr. et al. |
| 2011/0062794 A1 | 3/2011 | Vergoossen et al. |
| 2011/0068921 A1 | 3/2011 | Shafer |
| 2011/0094975 A1 | 4/2011 | Hardy |
| 2011/0127225 A1 | 6/2011 | Hooks, Jr. et al. |
| 2011/0168652 A1 | 7/2011 | Barkdoll |
| 2011/0215060 A1 | 9/2011 | Niederhuefner |
| 2011/0218889 A1 | 9/2011 | Westberg et al. |
| 2011/0227735 A1 | 9/2011 | Fawcett et al. |
| 2011/0282768 A1 | 11/2011 | Swafford, Jr. et al. |
| 2011/0284571 A1 | 11/2011 | Lockwood et al. |
| 2011/0310307 A1 | 12/2011 | Takahashi |
| 2012/0006764 A1 | 1/2012 | Hachmann et al. |
| 2012/0091162 A1 | 4/2012 | Overhultz et al. |
| 2012/0120571 A1 | 5/2012 | Bisesti et al. |
| 2012/0209426 A1 | 8/2012 | Lockwood et al. |
| 2012/0253508 A1 | 10/2012 | Holmes |
| 2012/0287090 A1 | 11/2012 | Cacioppo |
| 2012/0293330 A1 | 11/2012 | Grant et al. |
| 2013/0002422 A1 | 1/2013 | Wiese et al. |
| 2013/0024023 A1 | 1/2013 | Siegel et al. |
| 2013/0057524 A1 | 3/2013 | Bertin et al. |
| 2013/0106259 A1 | 5/2013 | Lockwood et al. |
| 2013/0141240 A1 | 6/2013 | Valiulis et al. |
| 2013/0142494 A1 | 6/2013 | Valiulis et al. |
| 2013/0144433 A1 | 6/2013 | Lockwood et al. |
| 2013/0247834 A1 | 9/2013 | Kodat |
| 2013/0312644 A1 | 11/2013 | Copeland |
| 2014/0055264 A1 | 2/2014 | Valiulis et al. |
| 2014/0055266 A1 | 2/2014 | Valiulis |
| 2014/0070948 A1 | 3/2014 | Valiulis et al. |
| 2014/0197953 A1 | 7/2014 | Valiulis et al. |
| 2014/0352372 A1 | 12/2014 | Grant et al. |
| 2015/0042178 A1 | 2/2015 | Kim |
| 2015/0068971 A1 | 3/2015 | Kostka |
| 2015/0096998 A1 | 4/2015 | Bird et al. |
| 2015/0235501 A1* | 8/2015 | Wang ............... G07F 17/3297 221/262 |
| 2015/0238026 A1 | 8/2015 | Chambers |
| 2015/0321827 A1 | 11/2015 | Lockwood et al. |
| 2015/0371482 A1 | 12/2015 | Szpak et al. |
| 2016/0005282 A1 | 1/2016 | Lax et al. |
| 2016/0132822 A1 | 5/2016 | Swafford |
| 2017/0202369 A1 | 7/2017 | Mercier et al. |
| 2017/0303704 A1 | 10/2017 | Taylor et al. |
| 2018/0047243 A1 | 2/2018 | Swafford, Jr. et al. |
| 2018/0107973 A1 | 4/2018 | Overhultz et al. |
| 2018/0365953 A1 | 12/2018 | Ewing et al. |
| 2019/0019140 A1 | 1/2019 | Costello et al. |
| 2019/0183259 A1 | 6/2019 | Grant et al. |
| 2019/0272498 A1 | 9/2019 | Swafford |
| 2019/0275498 A1 | 9/2019 | Tanba et al. |
| 2019/0290020 A1 | 9/2019 | Ewing et al. |
| 2019/0374048 A1 | 12/2019 | Valiulis et al. |
| 2021/0001785 A1 | 1/2021 | Rose |
| 2022/0000278 A1 | 1/2022 | Ewing et al. |
| 2022/0202207 A1 | 6/2022 | Ewing et al. |
| 2022/0240693 A1 | 8/2022 | Ewing et al. |
| 2023/0059326 A1 | 2/2023 | Ewing et al. |

FOREIGN PATENT DOCUMENTS

| | | |
|---|---|---|
| CN | 102763184 A | 10/2012 |
| CN | 103158757 A | 6/2013 |
| CN | 103198387 A | 7/2013 |
| CN | 204039597 U | 12/2014 |
| CN | 104631970 A | 5/2015 |
| CN | 204351457 U | 5/2015 |
| CN | 104981825 A | 10/2015 |
| CN | 107462171 A | 12/2017 |
| CN | 107529899 A | 1/2018 |
| CN | 108694540 A | 10/2018 |
| CN | 207943567 U | 10/2018 |
| DE | 202005010088 U1 | 9/2005 |
| DE | 102011012163 A1 | 8/2012 |
| EP | 0868871 A1 | 10/1998 |
| EP | 1256296 A2 | 11/2002 |
| EP | 1541064 A1 | 6/2005 |
| EP | 1541064 B1 | 2/2006 |
| EP | 2888723 A1 | 7/2015 |
| EP | 2988281 A1 | 2/2016 |
| GB | 2304102 A | 3/1997 |
| GB | 2360514 A | 9/2001 |
| KR | 100823026 B1 | 4/2008 |
| KR | 20100137956 A | 12/2010 |
| KR | 20110002261 U | 3/2011 |
| KR | 20110043837 A | 4/2011 |
| KR | 20110080411 A | 7/2011 |
| NL | 1001794 C2 | 6/1997 |
| WO | WO 9103967 A1 | 4/1991 |
| WO | WO 9740724 A1 | 11/1997 |
| WO | WO 9927824 A1 | 6/1999 |
| WO | WO 0181988 A2 | 11/2001 |
| WO | WO 2004/083051 A2 | 9/2004 |
| WO | WO 2005/107535 A1 | 11/2005 |
| WO | WO 2009/100857 A1 | 8/2009 |
| WO | WO 2011/025085 A1 | 3/2011 |
| WO | WO 2012/113536 A1 | 8/2012 |
| WO | WO 2012/127849 A1 | 9/2012 |
| WO | WO 2018/045038 A1 | 3/2018 |

OTHER PUBLICATIONS

POS Tuning—für mehr Erfolg am Point of Sale: The POS T-Systemtray; http://www.postuning.de/68.0.hyml?L=2; website; Mar. 29, 2006; 1 page.

Indyme smartresponse; 2 pages printed from internet http://www.indyme.com/; date last visited Apr. 8, 2013.

U.S. Appl. No. 18/305,022, Ewing et al., filed Apr. 21, 2023.
U.S. Appl. No. 18/106,233, Ewing et al., filed Feb. 6, 2023.
U.S. Appl. No. 18/114,012, Ewing et al., filed Feb. 24, 2023.

* cited by examiner

USER

◉ FRONT_STOCK
○ BACK_STOCK

[+ADD NEW] [IMPORT]

| ID | STORE | DEPARTMENT | SECTION | ROW | SKU | ROW POS. | | |
|---|---|---|---|---|---|---|---|---|
| 000003 | TWINSBURG OFFICE | TWN-DESIGN CENTER | DEAN M | TOP | 1111111111 | 3 | ✏ | ▭ |
| 000003 | TWINSBURG OFFICE | TWN-DESIGN CENTER | DEAN M | BOTTOM | 1111111111 | 9 | ✏ | ▭ |
| 000003 | TWINSBURG OFFICE | TWN-DESIGN CENTER | DEAN M | BOTTOM | 1111111111 | 9 | ✏ | ▭ |
| 000003 | TWINSBURG OFFICE | TWN-DESIGN CENTER | DEAN M | TOP | 2222222 | 2 | ✏ | ▭ |
| 0200E7 | ROCKFORD OFFICE | TEST LAB | ILP TEST ROOM | ROW 1 | 33333333 | 3 | ✏ | ▭ |
| 030805 | ROCKFORD OFFICE | TEST LAB | ILP TEST ROOM | ROW 1 | 444444444444 | 4 | ✏ | ▭ |
| 0200CA | ROCKFORD OFFICE | TEST LAB | ILP TEST ROOM | ROW 1 | 1111111111 | 6 | ✏ | ▭ |
| 03003C | ROCKFORD OFFICE | TEST LAB | ILP TEST ROOM | ROW 1 | 1111111111 | 1 | ✏ | ▭ |
| 010050 | ROCKFORD OFFICE | TEST LAB | ILP TEST ROOM | ROW 1 | 1111111111 | 1 | ✏ | ▭ |
| 030022 | ROCKFORD OFFICE | TEST LAB | ILP TEST ROOM | ROW 1 | 1111111111 | 1 | ✏ | ▭ |
| 190089 | TWINSBURG OFFICE | TWN-DESIGN CENTER | TWN-DESIGN... | PUSHER-ROW 1 | 10094 | 1 | ✏ | ▭ |
| 16008C | TWINSBURG OFFICE | TWN-DESIGN CENTER | TWN-DESIGN... | PUSHER-ROW 1 | 65880 | 2 | ✏ | ▭ |
| 190089 | TWINSBURG OFFICE | | TWN-DESIGN... | | | 0 | ✏ | ▭ |
| 160034 | TWINSBURG OFFICE | TWN-DESIGN CENTER | TWN-DESIGN... | PUSHER-ROW 1 | 33333333 | 3 | ✏ | ▭ |
| 2100E5 | TWINSBURG OFFICE | TWN-DESIGN CENTER | TWN-DESIGN... | PUSHER-ROW 1 | 30253 | 5 | ✏ | ▭ |
| 0408C6 | STORE POINT-DEMO #2 | DEMO DEPARTMENT | DEMO SECTION PUSHERS... | PUSHERS | 65880 | 1 | ✏ | ▭ |

FIG. 24

| ID | BRAND | PRODUCT DESCRIPTION | MODEL | QTY | QTY BACK STOCK | | |
|---|---|---|---|---|---|---|---|
| 11111111 | ABC | DEMO PRODUCT 1 | TEST-1 | 0 | | ✎ | ▢ |
| 3333333 | XYZ | LONG PRODUCT | LONG | 1 | | ✎ | ▢ |
| 4444444 | ABC | DEMO PRODUCT | TEST-2 | 2 | | ✎ | ▢ |
| 2222222 | XYZ | SHORT BOX PRODUCT | SHORT | 1 | | ✎ | ▢ |
| 5889 | GILLETTE | RAZOR & CARTRIDGES | FUSION 5 | 2 | | ✎ | ▢ |
| 6641 | EQUATE | NON DROWSY DAYTIME COLD & FLU | COLD & FLU | 4 | | ✎ | ▢ |
| 1667 | FORMULA | 12 OZ ROUND CARTRIDGE | GOOD START | 3 | | ✎ | ▢ |
| 0016 | OLAY | FACIAL CREAM | RGENENRIST | 5 | | ✎ | ▢ |
| 0253 | GILLETTE | 4 PACK CARTRIDGES | PROGLIDE | 6 | | ✎ | ▢ |
| 5687 | GILLETTE | 4 PACK CARTRIDGES | FUSION 5 | 6 | | ✎ | ▢ |
| 0797 | ENERGIZER | AA 8 PACK BATTERIES | AA-8 | 3 | | ✎ | ▢ |
| 5880 | GILLETTE | 2-BLADE X 1-RAZOR | PROGLIDE | 2 | | ✎ | ▢ |
| 0094 | AIRBORNE | VERY BERRY IMMUNE SUPPORT SUPPLIMENT | 10-PACK BOTTLE | 2 | | ✎ | ▢ |
| 23 | 123 | 123 | 123 | 6 | | ✎ | ▢ |
| 56 | 456 | 456 | 456 | 2 | | ✎ | ▢ |
| 78 | 678 | 678 | 678 | 5 | | ✎ | ▢ |

FIG. 25

| USER | | | | | | | | | |
|---|---|---|---|---|---|---|---|---|---|
| USERS | | | | | | +ADD NEW | IMPORT | | |
| LAST NAME | FIRST NAME | EMAIL | PHONE | AUTHORIZATION | STORES | | | | |
| USER-1 | LAST NAME-1 | EMAIL-1 | | SIFFRON ADMINISTRATOR | ROCKFORD OFFICE, TWINSBURG OFFICE, EURO SHOP - DEMO #1 | ⊞ | ✎ | ▢ | ⇦ |
| | | EMAIL-1 | | SIFFRON ADMINISTRATOR | | | | ▢ | ⇦ |
| USER-2 | LAST NAME-2 | EMAIL-2 | | ADMINISTRATOR | TWINSBURG OFFICE | ⊞ | ✎ | ▢ | ⇦ |
| USER-3 | LAST NAME-3 | EMAIL-3 | | MANAGER | TWINSBURG OFFICE | ⊞ | ✎ | ▢ | ⇦ |
| USER-4 | LAST NAME-4 | EMAIL-4 | | MANAGER | ROCKFORD OFFICE, TWINSBURG OFFICE, EURO SHOP - DEMO #1 | ⊞ | ✎ | ▢ | ⇦ |
| USER-5 | LAST NAME-5 | EMAIL-5 | | SIFFRON ADMINISTRATOR | ROCKFORD OFFICE, EURO SHOP - DEMO #1 | ⊞ | ✎ | ▢ | ⇦ |
| USER-6 | LAST NAME-6 | EMAIL-6 | | SIFFRON ADMINISTRATOR | ROCKFORD OFFICE, TWINSBURG OFFICE, EURO SHOP - DEMO #1 | ⊞ | ✎ | ▢ | ⇦ |
| USER-7 | LAST NAME-7 | EMAIL-7 | | SIFFRON ADMINISTRATOR | ROCKFORD OFFICE, EURO SHOP - DEMO #1 | ⊞ | ✎ | ▢ | ⇦ |
| USER-8 | LAST NAME-8 | EMAIL-8 | | SIFFRON ADMINISTRATOR | ROCKFORD OFFICE, EURO SHOP - DEMO #1 | ⊞ | ✎ | ▢ | ⇦ |
| USER-9 | LAST NAME-9 | EMAIL-9 | | ADMINISTRATOR | ALLTRONICS-TEST UNIT | ⊞ | ✎ | ▢ | ⇦ |
| USER-10 | LAST NAME-10 | EMAIL-10 | | ADMINISTRATOR | | ⊞ | ✎ | ▢ | ⇦ |
| USER-11 | LAST NAME-11 | EMAIL-11 | | MANAGER | ROCKFORD OFFICE, EURO SHOP - DEMO #1 | ⊞ | ✎ | ▢ | ⇦ |

FIG. 26

ANTI-SWEEPING HOOK WITH INTEGRATED INVENTORY MONITORING AND/OR LOSS PREVENTION FUNCTIONALITY

CROSS-REFERENCE TO RELATED PATENT APPLICATIONS

This patent application is a continuation-in-part of co-pending U.S. patent application Ser. No. 17/887,655, filed Aug. 15, 2022, which claims the benefit of U.S. Provisional Patent Application No. 63/236,097, filed Aug. 23, 2021, the entire teachings and disclosures of which are incorporated herein by reference thereto.

FIELD OF THE INVENTION

This invention generally relates to retail merchandise displays, and more particularly to the management of inventory of retail merchandise of a retail merchandise displays.

BACKGROUND OF THE INVENTION

In certain retail environments that use conventional wire hook displays, one disadvantage is that a large number of items can often be easily swept or removed from the wire hook display at any one time, through a simple sliding action. As a result, thieves have been able to enter a commercial environment and simply remove all items from a conventional wire hook in a simple sliding motion and abscond without drawing attention to their actions.

Consequently, there is a need to provide a device that provides many of the advantages of the conventional wire hook display device while also providing a deterrent against theft of items stored on the display device.

Further yet, monitoring of inventory on a wire hook is desirable. Remote monitoring or automatic monitoring of the inventory is additionally desirable.

Embodiments of the present invention provides such a device. These and other advantages of the invention, as well as additional inventive features, will be apparent from the description of the invention provided herein.

BRIEF SUMMARY OF THE INVENTION

In one aspect, embodiments of the invention provide an anti-sweeping hook that includes a display hook for storing a retail item. The display hook may be substantially straight and having a first end and a second end opposite the first end. A helical coil is disposed about the display hook and extending along a lengthwise portion of the display hook. The helical coil has a first coil end proximate the first end of the display hook. Rotation of the helical coil in a first direction loads the retail item onto the display hook. Rotation of the helical coil in a second direction opposite the first direction removes the retail item from the display hook. A rotating handle is attached to the first end of the display hook and to the first coil end. The rotating handle is configured to determine an extent of rotation for the rotating handle.

In a particular embodiment, the rotating handle includes a first contact and a second contact disposed within a main housing of the rotating handle such that an electrical connection between the first and second contacts indicates some rotation of the rotating handle. In a more particular embodiment, the rotating handle includes a rotor and stator each disposed within the main housing of the rotating handle. The first contact is attached to the main housing, and the second contact is attached to the rotor. The rotor and stator are configured such that rotation of the rotor in a first direction prevents any electrical connection between the first and second contacts, and rotation of the rotor in a second direction opposite the first direction facilitates electrical connections between the first and second contacts.

In certain embodiments, the stator is configured to prevent rotation of the stator and of the second contact in the first direction, and configured to allow rotation of the stator and of the second contact in the second direction. The rotating handle may include a circuit board with circuitry configured to count the electrical connections between the first and second contacts. In some embodiments, the circuitry includes an MCU configured to trigger an alarm if a threshold number of electrical connections between the first and second contacts occurs within a predetermined time period.

The alarm may be one of an audio alarm, a visual alarm, and a wired or wireless signal transmitted to a local or remotely-located receiving device. In particular embodiments, the MCU enters a sleep mode if there is no electrical connection between the first and second contacts for the predetermined time period. In other embodiments, the MCU provides one of an audio indicator, a visual indicator, and a wired or wireless indicator signal transmitted to a local or remotely-located receiving device prior to entering sleep mode.

In another aspect, embodiments of the invention provide a rotating handle for an anti-sweeping retail display hook. The rotating handle includes a first contact and a second contact disposed within a main housing of the rotating handle such that an electrical connection between the first and second contacts indicates some rotation of the rotating handle. A rotor and stator are each disposed within the main housing of the rotating handle. The first contact is attached to the main housing, and the second contact is attached to the rotor. The rotor and stator are configured such that rotation of the rotor in a first direction prevents any electrical connection between the first and second contacts, and rotation of the rotor in a second direction opposite the first direction facilitates electrical connections between the first and second contacts.

In some embodiments, the stator is configured to prevent rotation of the stator and of the second contact in the first direction, and configured to allow rotation of the stator and of the second contact in the second direction. In other embodiments, the rotating handle includes a circuit board with circuitry configured to count the electrical connections between the first and second contacts. The circuitry may include an MCU configured to trigger an alarm if a threshold number of electrical connections between the first and second contacts occurs within a predetermined time period. The alarm may be one of an audio alarm, a visual alarm, and a wired or wireless signal transmitted to a local or remotely-located receiving device.

In particular embodiments, the MCU enters a sleep mode if there is no electrical connection between the first and second contacts for the predetermined time period. In a further embodiment, the MCU provides an audio indicator, a visual indicator, and a wired or wireless indicator signal transmitted to a local or remotely-located receiving device prior to entering sleep mode.

In one embodiment, an anti-sweeping hook including a display hook, a helical coil, and a rotating handle is provided. The display hook stores one or more retail items. The display hook may be substantially straight and has a first end and a second end opposite the first end. The helical coil is disposed about the display hook and extends along a lengthwise portion of the display hook. The helical coil has a first coil end proximate the first end of the display hook. Rotation of the helical coil in a first direction loads retail items onto the display hook. Rotation of the helical coil in a second direction opposite the first direction removes the retail items from the display hook. The rotating handle is attached to the first end of the display hook and to the first coil end, wherein the rotating handle is configured to determine a change in a number of retail items stored on the display hook, based on the number, degree, or extent of rotation and direction of rotation of the rotating handle.

In one embodiment, the rotating handle includes a first circuit and a second circuit. A state change of the first circuit without a state change in the second circuit indicates rotation of the rotating handle in a first direction and a state change of both the first and second circuits indicates rotation of the rotating handle in a second direction, opposite the first.

In one embodiment, the rotating handle includes a rotor and stator each disposed within a main housing of the rotating handle. The rotor rotates relative to the stator with the main housing when the main housing rotates in a first direction and the rotor remains fixed relative to the stator when the main housing is rotated in a second direction. The first circuit includes a first contact carried by the stator and a pair of contacts carried by the main housing. The second circuit includes a second contact carried by the rotor and a pair of contacts carried by the main housing. Rotating the main housing in the first direction causes the first contact to selectively connect and disconnect the pair of contacts of the first circuit carried by the main housing but does not cause the second contact to selectively connect and disconnect the pair of contacts of the second circuit carried by the main housing. Rotating the main housing in the second direction causes the first contact to selectively connect and disconnect the pair of contacts of the first circuit carried by the main housing and does cause the second contact to selectively connect and disconnect the pair of contacts of the second circuit carried by the main housing.

In one embodiment, the stator is configured to prevent rotation of the rotor and of the second contact in the second direction and configured to allow rotation of the rotor and of the second contact in the first direction.

In one embodiment, the rotating handle includes a circuit board with circuitry configured to count the electrical connections between the first contact and the pair of contacts carried by the rotating handle of the first circuit and to count the electrical connections between the second contact and the pair of contacts carried by the rotating handle of the second circuit.

In one embodiment, the rotating handle includes a wireless communications module configured to transmit inventory data related to the number of retail items stored on the display hook or a change in the number to a local or remotely-located receiving device.

In one embodiment, the circuit board is configured to determine a number of retail items stored on the display hook, or a change in the number of retail items stored on the display hook, based on a number of electrical connections made by the first and second circuits.

In one embodiment, the circuit board is configured to determine the change in the number of retail items stored on the display hook based on a number of electrical connections made by the first and second circuits.

In one embodiment, the stator is fixed relative to the display hook.

In an embodiment, a method of determining a change in a number of retail items stored on an anti-sweeping hook is provided. The method includes rotating a rotating handle of the anti-sweeping hook. The anti-sweeping hook includes a display hook configured for storing retail items. The display hook has a first end and a second end opposite the first end. The anti-sweeping hook includes a helical coil disposed about the display hook and extending along a lengthwise portion of the display hook. The helical coil has a first coil end proximate the first end of the display hook. Rotation of the helical coil in a first direction loads the retail items onto the display hook, and rotation of the helical coil in a second direction opposite the first direction removes the retail items from the display hook. The rotating handle is attached to the first end of the display hook and to the first coil end. The method includes determining a change in the number of retail items stored on the anti-sweeping hook by determining the number, degree, or extent of rotation of the rotating handle and direction of rotation of the rotating handle.

In one embodiment, determining the direction of rotation of the rotating handle includes determining that the direction of rotation is in a first direction when a state change of a first circuit of the rotating handle without sensing a state change of a second circuit is sensed. The method also includes determining that the direction of rotation is in a second direction, opposite the first, when a state change of both the first and second circuits is sensed.

In one embodiment, the first circuit includes a first contact carried by the stator and a pair of contacts carried by the main housing. The second circuit includes a second contact carried by the rotor and a pair of contacts carried by the main housing. The method includes rotating a main housing of the rotating handle in a first direction. Rotation of the main housing in the first direction rotates a rotor of the rotating handle relative to a stator of the rotating handle. Rotation of the main housing in the first direction causes the first contact to selectively connect and disconnect the pair of contacts of the first circuit carried by the main housing but does not cause the second contact to selectively connect and disconnect the pair of contacts of the second circuit carried by the main housing. When rotating a main housing of the rotating handle in a second direction, the rotor remains fixed relative to the stator when the main housing is rotated in the second direction. Rotation of the main housing in the second direction causes the first contact to selectively connect and disconnect the pair of contacts of the first circuit carried by the main housing and does cause the second contact to selectively connect and disconnect the pair of contacts of the second circuit carried by the main housing.

In one embodiment, the method includes preventing, with the stator, rotation of the rotor and of the second contact in the second direction. The method includes allowing, with the stator, rotation of the rotor and of the second contact in the first direction.

In one embodiment, the method includes counting, with a circuit board of the rotating handle, the electrical connections between the first contact and the pair of contacts carried by the rotating handle of the first circuit. The method includes counting, with the circuit board, the electrical connections between the second contact and the pair of contacts carried by the rotating handle of the second circuit.

In one embodiment, the circuit board is configured to determine a change in the number of retail items stored on the anti-sweeping hook based on a number of electrical connections made by the first and second circuits.

In one embodiment, the circuit board is configured to determine a number of retail items stored on the anti-sweeping hook based on the change in the number of retail items stored on the anti-sweeping hook based on the number of electrical connections made by the first and second circuits. In one embodiment, the stator is fixed relative to the display hook.

In certain aspects, embodiments of the invention provide an anti-sweeping hook system that includes an anti-sweeping hook. The anti-sweeping hood has a display hook for storing a retail item. The display hook may be substantially straight and have a first end and a second end opposite the first end. A helical coil is disposed about the display hook and extends along a lengthwise portion of the display hook. The helical coil has a first coil end proximate the first end of the display hook. Rotation of the helical coil in a first direction loads the retail item onto the display hook, and rotation of the helical coil in a second direction opposite the first direction removes the retail item from the display hook. A rotating handle is attached to the first end of the display hook and to the first coil end. The rotating handle is configured to determine a change in a number of retail items stored on the display hook based on the number, degree, or extent of rotation and on the direction of rotation of the rotating handle. The rotating handle includes an MCU and a wireless communications module configured to process and wirelessly transmit inventory data indicating the number of retail items stored on the display hook.

In a particular embodiment, the rotating handle includes a first contact and a second contact disposed within a main housing of the rotating handle such that an electrical connection between the first and second contacts indicates some rotation of the rotating handle. In some embodiments, the rotating handle includes a rotor and stator each disposed within the main housing of the rotating handle. The first contact is attached to the main housing, and the second contact is attached to the rotor. The rotor and stator are configured such that rotation of the rotor in a first direction prevents any electrical connection between the first and second contacts, and rotation of the rotor in a second direction opposite the first direction facilitates electrical connections between the first and second contacts.

In embodiments of the anti-sweeping hook system, the MCU is configured to determine the number of retail items stored on the display hook based on a number of electrical connections made by the first and second contacts. Additionally, the MCU may be further configured to transmit a unique identifier for the anti-sweeping hook. In certain embodiments, the anti-sweeping hook includes either an RFID reader, a UPC reader, or a QR code scanner to automatically scan an RFID tag, a UPC or QR code on each retail item.

Embodiments of the invention further include a remotely-located receiving device configured to receive inventory data from the wireless communications module, and to transmit the inventory data to an upper-level system controller. The receiving device may be configured to transmit, along with the inventory data, a unique identifier for the receiving device. Additionally, the receiving device may include an external antenna, such that the receiving device can receive data from the anti-sweeping hook at distances up to 200 feet from the receiving device.

The anti-sweeping hook system may further include an upper-level system controller configured to receive the inventory data, and to transmit the inventory data to a networked computer server. In certain embodiments, the upper-level system controller is configured to transmit, along with the inventory data, a unique identifier for the upper-level system controller. Furthermore, the upper-level system controller may be configured to receive data from the computer server. Further still, the data received from the computer server may include a software update for the upper-level system controller. In some embodiments, the upper-level system controller is configured to communicate directly with the MCU via the wireless communications module. In other embodiments, the upper-level system controller includes one or more visual indicators configured to indicate whether the upper-level system controller is receiving power, or transmitting data, or receiving data.

The MCU may be configured to repeat each wireless transmission of inventory data at least once. Embodiments of the anti-sweeping hook further include a networked computer server configured to receive and aggregate the inventory data transmitted by the MCU. In particular embodiments, the inventory data is transmitted from the MCU to an upper-level system controller which then transmits the inventory data to the computer server. The MCU may be configured to transmit the inventory data to an upper-level controller, which is configured to transmit the inventory data via a network link to the computer server. In a particular embodiment, communication via the network link comprises communication via the internet, or via an intranet, or via an extranet.

In yet another aspect, embodiments of the invention provide a retail inventory management system that includes the anti-sweeping hook system described above, and a computer server configured to receive and aggregate the inventory data transmitted by the MCU. The computer server is linked to a network and further configured to send the inventory data to a display of a client device. The computer server is configured to transmit inventory data to the display, in real-time, such that the display shows the inventory data from a plurality of anti-sweeping hooks.

In particular embodiments, the computer server causes the display to show the inventory data both graphically and textually. Furthermore, the computer server may be configured to transmit inventory data to the display, in real-time, indicating a number of retail items, for a particular SKU, disposed on each anti-sweeping hook in a section of a particular store. In other embodiments, the computer server is configured to transmit inventory data to the display, in real-time, indicating a number of retail items, for a particular SKU, disposed on one or more anti-sweeping hooks in a particular store. In a further embodiment, the computer server is further configured to transmit inventory data to the display, in real-time, indicating the number of retail items, for a particular SKU, disposed on the one or more anti-sweeping hooks in each store of a plurality of stores.

In certain embodiments, the computer server is configured to transmit inventory data to the display, in real-time, indicating the number of retail items, for a plurality of SKUs, disposed on one or more anti-sweeping hooks in a particular store. Furthermore, the computer server may be further configured to transmit inventory data to the display, in real-time, indicating the number of retail items, a plurality of SKUs, disposed on the one or more anti-sweeping hooks in each store of a plurality of stores. In some embodiments, the computer server is configured to transmit inventory data to the display, in real-time, indicating a number of backstock items for the particular SKU in the particular store. Additionally, the computer server may be further configured to transmit inventory data to the display, in real-time, indicating the number of backstock items for a plurality of SKUs in each store of a plurality of stores. Further still, the computer server may be configured to automatically prompting a user to restock the one or more anti-sweeping hooks using backstock items for one or more SKUs in one or more of the plurality of stores.

In particular embodiments, the computer server is configured to transmit inventory data to the display, in real-time, indicating a number of each retail item, for an entire department or category of retail items, disposed on one or more anti-sweeping hooks in a particular store. In other embodiments, the computer server is configured to transmit inventory data to the display, in real-time, indicating the number of each retail item, for the entire department or category of retail items, disposed on the one or more anti-sweeping hooks in each store of a plurality of stores.

The computer server may also be configured to transmit inventory data to the display, in real-time, indicating a number of SKUs which are out-of-stock at a particular store. In some embodiments, the computer server is configured to transmit inventory data to the display, in real-time, indicating each store of a plurality of stores where at least one SKU is out-of-stock. In other embodiments, the computer server is configured to automatically generate a purchase order for an out-of-stock SKU, or to automatically generate an alert prompting a user to create the purchase order.

In certain embodiments, the computer server is configured to transmit inventory data, simultaneously and in real-time, to a plurality of displays located locally or remotely from the computer server. Additionally, the computer server may be configured with multiple levels of access for users, wherein each access level has different privileges associated therewith. In some embodiments, the client device is one of a desktop computer, a laptop computer, a notebook computer, a tablet computer, a smartphone, or a smartwatch. In other embodiments, the computer server is configured to calculate and transmit inventory data to the display indicating a rate of inventory usage for one or more SKUs, or for one or more stores. The computer server may be configured to calculate and transmit inventory data to the display indicating a rate of inventory usage by hour of the day, day of the week, week of the month, or month of the year. Further still, the computer server may be configured to analyze trends in the rate of inventory usage in order to determine when inventory at a particular store is to be replenished.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 24 is an exemplary screen shot of a graphic display provided by the computer server to a client device, the display showing an inventory count by store and department, the display using a database table-based display primarily in text, according to an embodiment of the invention;

FIG. 25 is an exemplary screen shot of a graphic display provided by the computer server to a client device, the display showing an inventory count by brand and product description, the display using a database table-based display primarily in text, according to an embodiment of the invention; and FIG. 26 is an exemplary screen shot of a display provided by the computer server to a client device, the display showing the identity, contact information, and authorization level for individual users, in accordance with an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
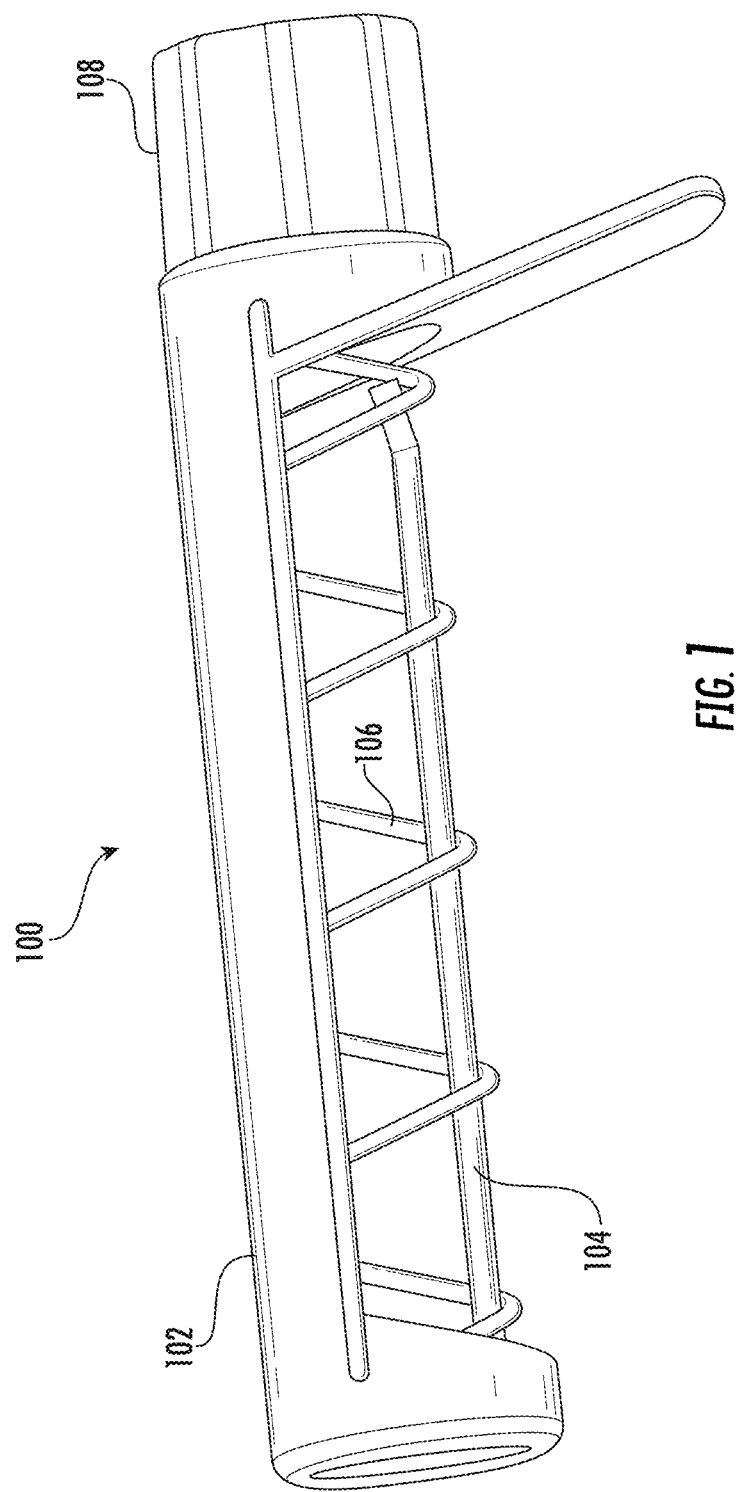
FIG. 1 is a perspective view of an anti-sweeping hook with integrated loss prevention functionality, constructed in accordance with an embodiment of the invention.

FIG. 1 is a perspective view of an anti-sweeping hook 100 with integrated inventory monitoring and/or loss prevention functionality, constructed in accordance with an embodiment of the application. The anti-sweeping hook 100 includes a housing 102 in which is disposed a display hook 104 and a helical coil 106 which is used in the loading and unloading of retail items or merchandise stored on the display hook 104. In the embodiment of FIG. 1, the display hook 104 is substantially straight. The display hook 104 may be bend or curved at one end. The coil 106 is coupled to a rotating handle 108, which rotates the coil 106 as it is turned. For example, the rotating handle 108 may be rotated in a clockwise direction when loading merchandise onto the display hook 104. The coil 106 would operate to move the merchandise onto the display hook 104 away from the user or customer. Accordingly, rotating the rotating handle 108 in a counterclockwise direction would operate to remove the merchandise from the display hook 104. It should be recognized that, in other embodiments, the direction of rotation for the rotating handle 108 could be clockwise for removing merchandise and counterclockwise for loading merchandise.

Figure 2:
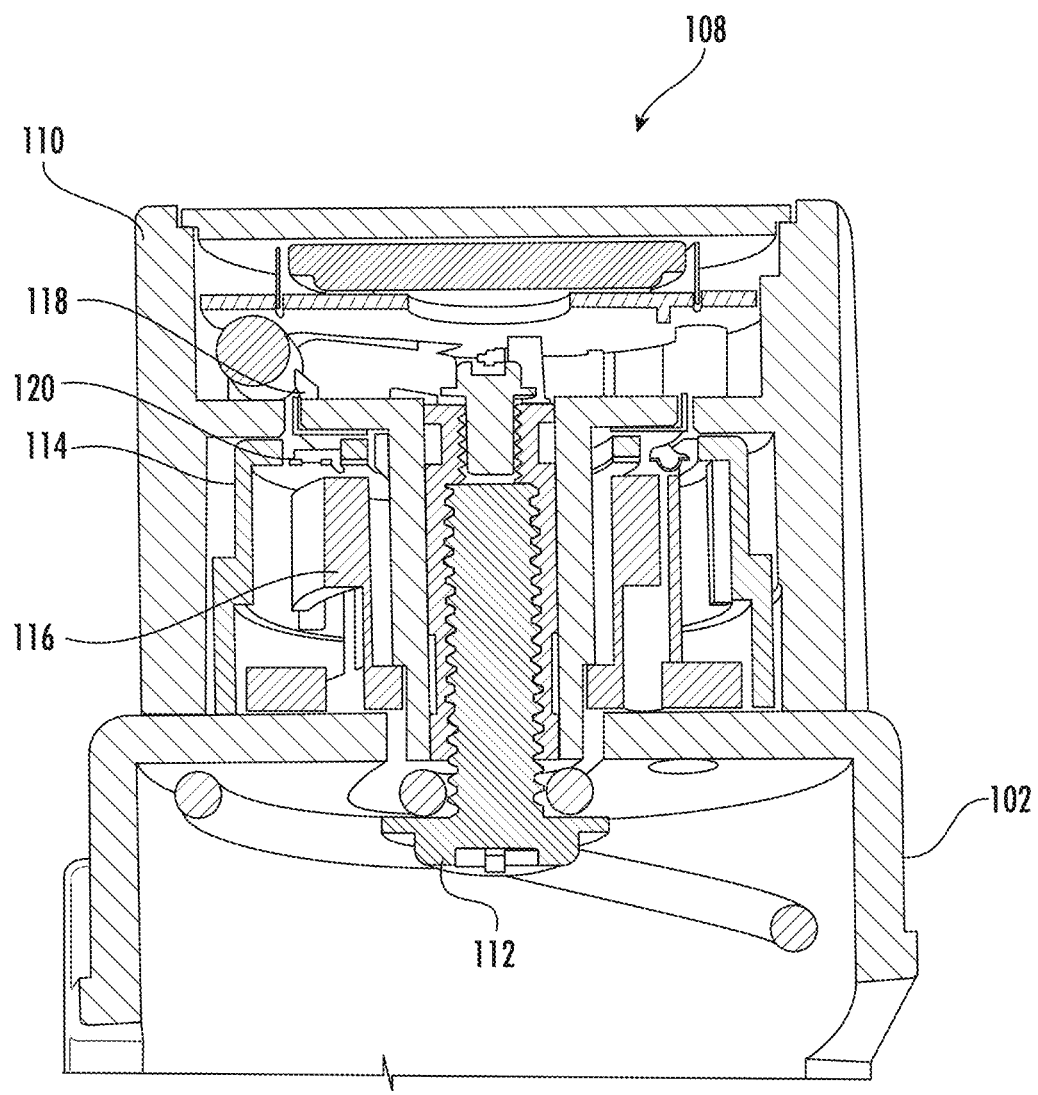
FIG. 2 is a cross-sectional view of a rotating handle for the anti-sweeping hook, constructed in accordance with an embodiment of the invention.

To prevent sweeping, or theft, of all of the retail merchandise on the display hook 104, the rotating handle 108 includes components designed to monitor the removal of merchandise from the display hook 104. FIG. 2 shows a cross-sectional view of the rotating handle 108, constructed in accordance with an embodiment of the application. In the embodiment of FIG. 2, the rotating handle 108 has a main rotating handle housing 110 and a central fastener 112 which connects the rotating handle 108 to the coil 106 disposed within housing 102.

Figure 3:
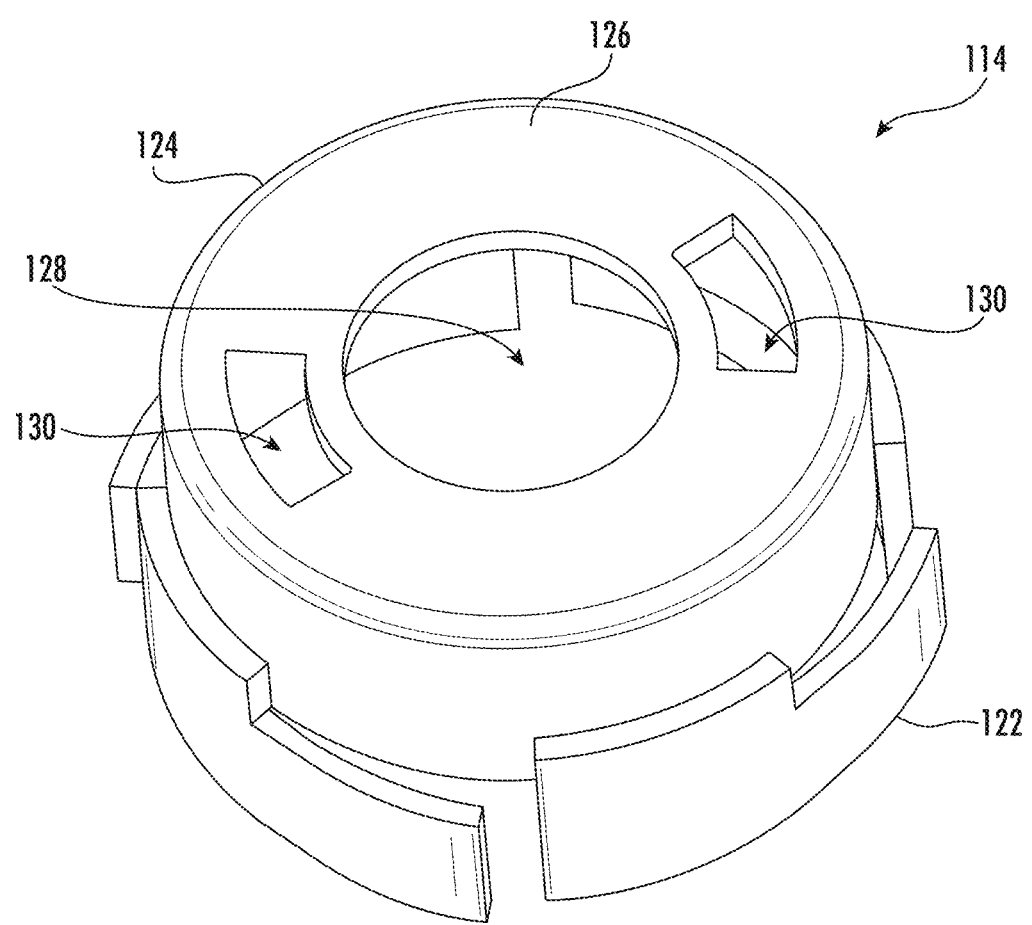
FIG. 3 is a perspective view of a rotor used in the rotating handle for the anti-sweeping hook, constructed in accordance with an embodiment of the invention.
Figure 4:
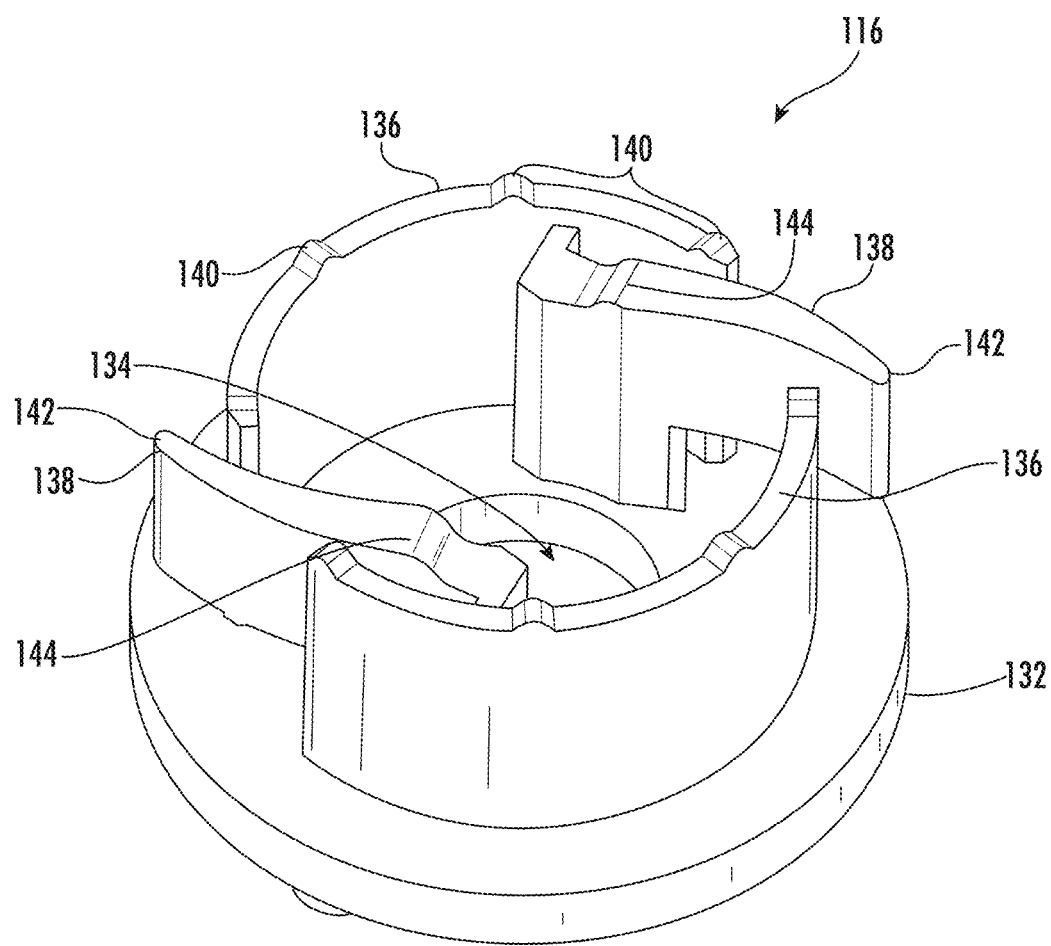
FIG. 4 is a perspective view of a stator used in the rotating handle for the anti-sweeping hook, constructed in accordance with an embodiment of the invention.

The main rotating handle housing 110 houses a rotor 114, which is shown in more detail in the perspective view of FIG. 3, and a stator 116, which is shown in more detail in FIG. 4. The main rotating handle housing 110 also houses a first contact 118, also shown and described below in relation to FIG. 5. A second contact 120 is disposed within the main rotating handle housing 110 and shown in more detail in FIG. 6.

As shown in the embodiment of FIG. 2, the first contact 118 is secured to the main rotating handle housing 110, while the second contact 120 is secured to the rotor 114. In FIG. 2, the stator 116 is positioned below and within the rotor 114.

The embodiment of the rotor 114, shown in the perspective view of FIG. 3, includes a lower perimeter wall 122, which includes notches and openings to facilitate attachment to an interior wall of the main rotating handle housing 110. An upper portion 124 of the rotor 114 includes a top surface 126 with a central opening 128 and two arcuate openings 130 located on opposite sides of the central opening 128. The central opening 128 accommodates the aforementioned central fastener 112, which, in the embodiment of FIG. 2, is positioned along a central portion of the main rotating handle housing 110. As will be explained below, the two arcuate openings 130 allow for electrical contact between the first contact 118 and the second contact 120.

That electrical contact is facilitated by the interaction between the rotor 114 and the stator 116. FIG. 4 is a perspective view of the stator 116 according to an embodiment of the invention. The embodiment of the stator 116 shown in FIG. 4 includes a base 132 with a base central opening 134. On opposite sides of the base central opening 134, there are two curved walls 136. There are two gaps on opposite sides of the base central opening 134 between the two curved walls 136, and, in those gaps, there are two sloped barriers 138. Each of the two curved walls 136 has a plurality of raised portions 140. In the embodiment shown, each of the two curved walls 136 has four raised portions 140, though it is envisioned that alternate embodiments of the stator 116 may have curved walls 136 with a greater or lesser number of raised portions. The sloped barriers 138 have a low end 142 and a high end 144 which slopes upward from the low end 142.

Figure 5:
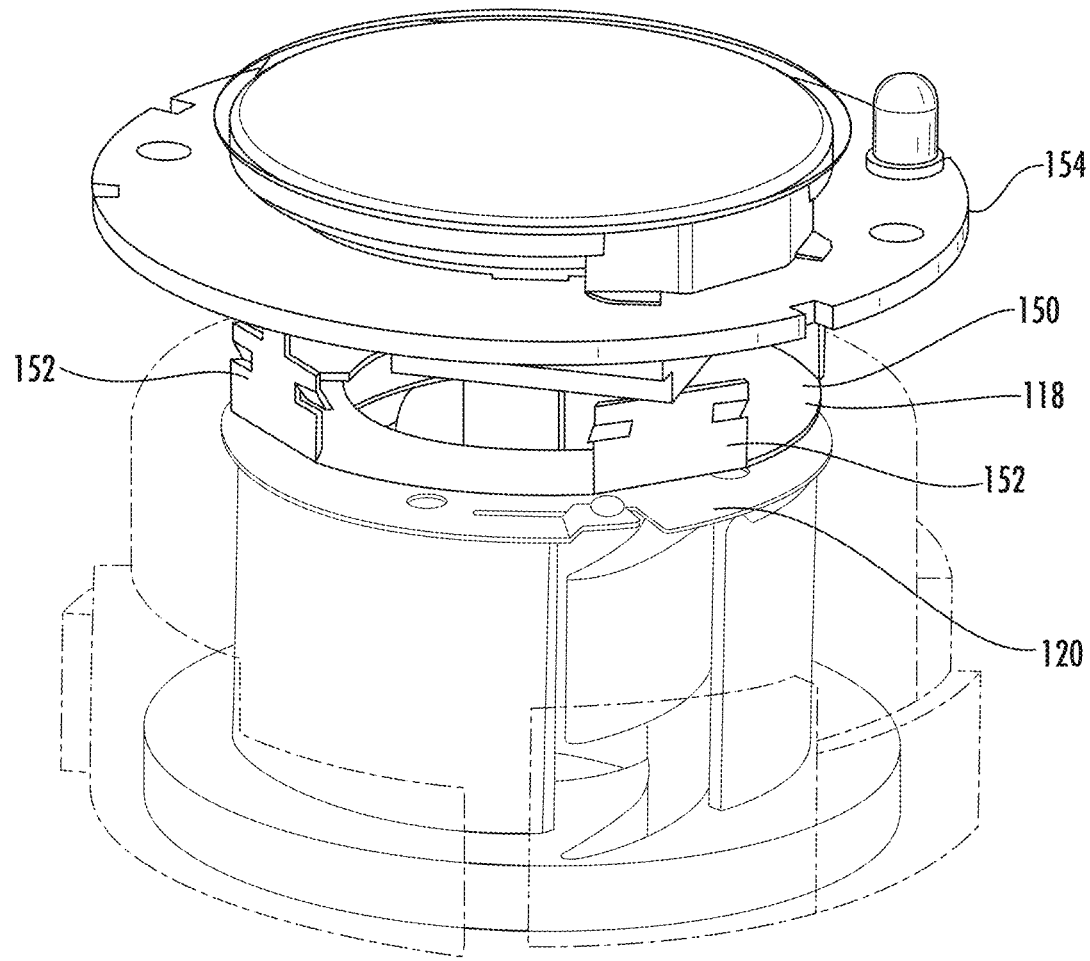
FIG. 5 is a perspective view a portion of the rotating handle, according to an embodiment of the invention.

FIG. 5 is a perspective view a portion of the rotating handle 108, according to an embodiment of the invention, which shows the first and second contacts 118, 120. In the embodiment shown, the first contact 118 has a flat ring-shaped portion and a plurality of tabs 152 to provide electrical connection with a circuit board 154.

Figure 6:
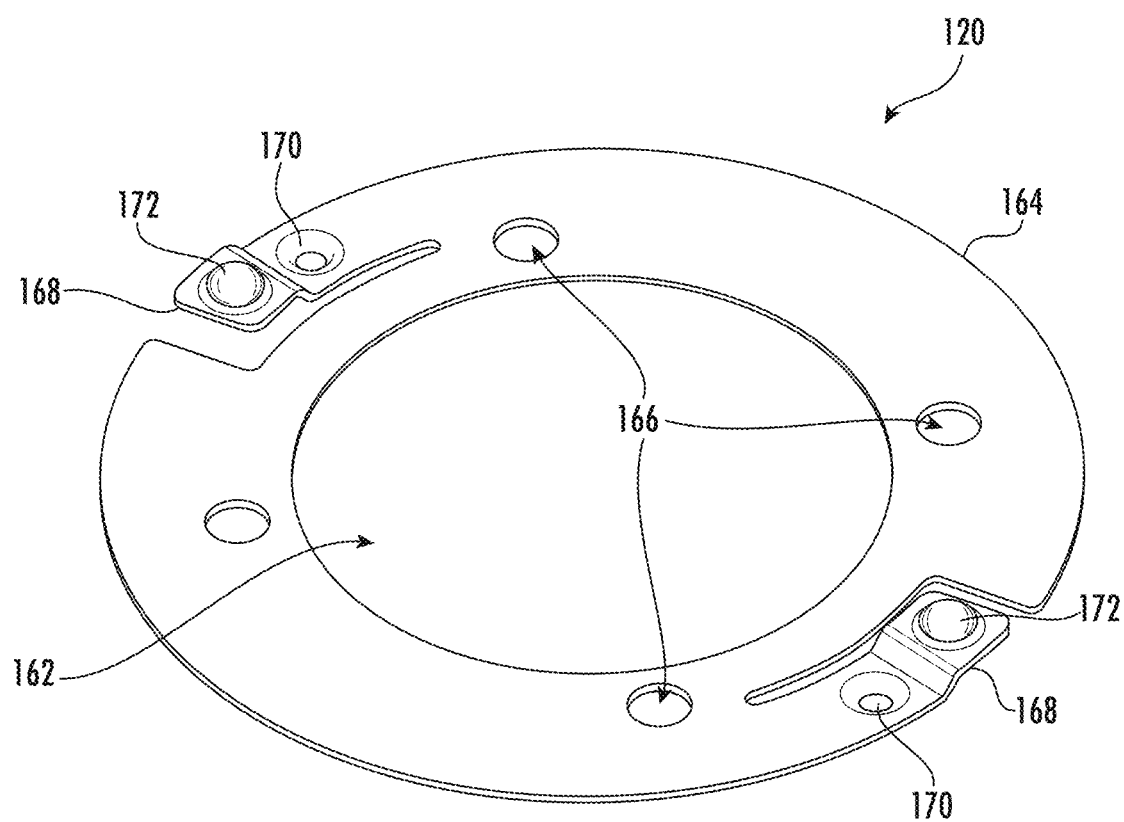
FIG. 6 is a perspective view of the second contact in accordance with an embodiment of the invention.

FIG. 6 is a perspective view of the second contact 120 in accordance with an embodiment of the invention. In the embodiment of FIG. 6, the second contact 120 has a main opening 162 surrounded by a ring-like body 164 which has a plurality of small openings 166 to facilitate attachment of the second contact 120 to the rotor 114. The ring-like body 164 includes two contact fingers 168 located on opposite sides of the main opening 162. Each contact finger 168 has a downward-facing bump 170 and an upward-facing bump 172. The two contact fingers 168 are configured to move relative to the ring-like body 164.

Referring to FIGS. 2-6, the anti-sweeping hook 100 can be described in operation. As shown in FIG. 2, the first contact 118 is attached to an interior surface of the main rotating handle housing 110 in close proximity to the rotor 114, which, as described above, is attached to a different interior surface of the main rotating handle housing 110. The stator 116 is positioned within the rotor 114 such that the two curved walls 136 and the plurality of raised portions 140 thereon are aligned with the two arcuate openings 130 of the rotor 114.

The sloped barriers 138 on the stator 116 are designed such that they prevent rotation of the rotor 114 in one direction. More particularly, when the rotating handle 108, and more particularly the main rotating handle housing 110, is rotated in a first direction, the high ends 144 of the two sloped barriers 138 come into contact with the rotor 114 at the two arcuate openings 130 to prevent the rotor 114 from rotating with the main rotating handle housing 110. Rotation of the main rotating handle housing 110 in this first direction is for loading retail items or merchandise onto the display hook 104.

When the rotating handle 108 and the main rotating handle housing 110 are rotated in a second direction opposite the first direction, the two arcuate openings 130 first contact the low end 142 of the two sloped barriers 138 such that the rotor 114 is not prevented from rotating with the main rotating handle housing 110. As the main rotating handle housing 110 is rotating in this second direction, the rotor 114 and attached second contact 120 are rotating as well. This causes the two fingers 168 on the second contact 120 to rise and fall as the downward-facing bumps 170 come into contact with the plurality of raised portions 140 on the two curved walls 136 of the stator 116. When the two fingers 168 rise due to this contact with the raised portions 140, the two upward-facing bumps 172 of the second contact 120 come into contact with the first contact 118 attached to the main rotating handle housing 110. The resulting electrical connection between the first and second contacts 118, 120 is detected by circuitry on the circuit board 154. Rotation of the main rotating handle housing 110 in this second direction is for removing merchandise from the display hook 104. Thus, with the stator 116, as shown, having four raised portions 140 on each curved wall 136, there would be eight electrical connections between the first and second contacts 118, 120 for each rotation of the rotating handle 108 in the second direction.

Figure 7:
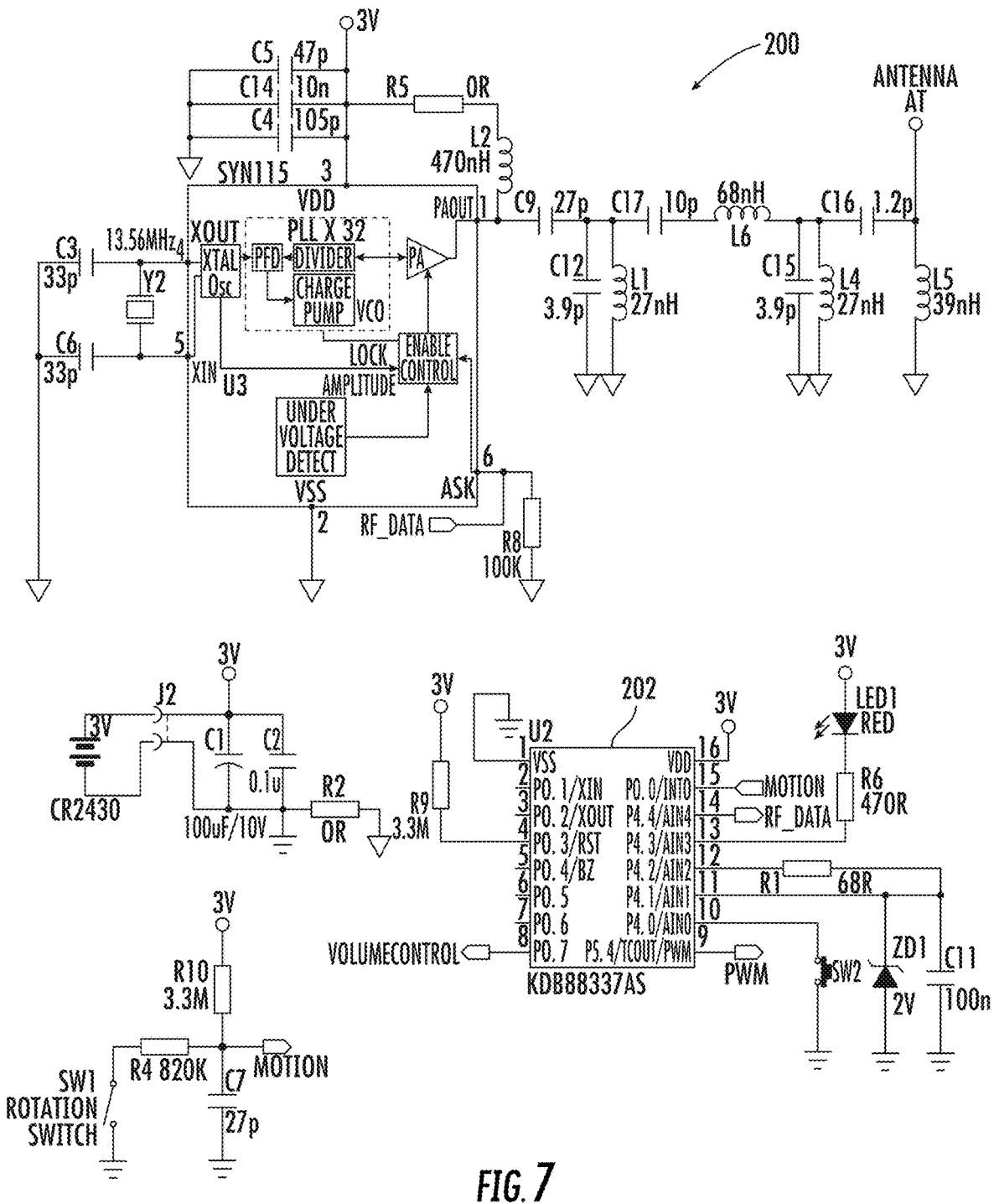
FIG. 7 is a schematic diagram for an exemplary circuit which is included on a circuit board shown in FIG. 5, in accordance with an embodiment of the invention.

FIG. 7 shows a schematic diagram for an exemplary circuit 200, which is included on the circuit board 154 shown in FIG. 5. In one example, when power is supplied to the product, port P5.4 emits an audio signal, such as a beep. A visual signal, such as an LED may flash synchronously at port P4.3, then a microcontroller unit (MCU) 202 enters sleep mode in which the MCU 202 conserves energy.

When the rotating handle 108 is rotated, the MCU 202 wakes up from sleep mode. In such an instance, MCU port P0.0 detects the trigger signal (rotation handle rotates), and counts pulses, or the electrical connections between first and second contacts 118, 120 generated by each rotation of the rotating handle 108. In certain embodiments, the first and second contacts 118, 120 and various components thereof are in operable communication with the MCU 202. The MCU 202 may be, for example, a microprocessor, or any combination of firmware, hardware, and/or software necessary to achieve the desired functionality. The MCU 202 outputs an audio, visual, or radio signal according to the following conditions.

For example, if the number of accumulated electrical connections or pulses in a predetermined time period (e.g., 10 seconds) exceeds a threshold value (e.g., 24, which for the embodiments shown indicates three full rotations of the rotating handle 108), the MCU 202 outputs an audio, visual, wired or wireless alarm signal. The alarm signal, which indicates that three or more items have been removed from the display hook 104 in a short period of time, which may indicate a theft in progress. In another example, the number of pulses generated by each rotation operation, during the predetermined time period, is greater than one but less than 24, MCU 202 outputs an audio, visual or radio signal indicative of a non-theft condition or that the MCU 202 is entering sleep mode. If there are no pulses for a predetermined period of time (e.g., 0.6 seconds at Port P0.0), the MCU 202 determines that the current rotating operation of the rotating handle 108 has been completed.

In a particular embodiment, the visual indicator is an LED, where the LED flashes synchronously with the audio signal when an alarm is triggered, or flashes synchronously with no audio alarm. The MCU 202 may also cause the LED flash to flash in a specific pattern, possibly in concert with an audio signal, to signal a low voltage warning. The MCU 202 is also in communication with a wireless communication module 356 (shown in FIG. 18) configured to send data including, but not limited to, rotation and direction of rotation information, inventory data, alarm status, and other information collected by the MCU 202 to a receiving device 301.

As stated, the data transmitted from the MCU 202 to the receiving device 301 may include at least one or all of an inventory status, alarm status, and the total extent and direction of rotation of the anti-sweeping hook 300. In at least one embodiment of the invention, there are a plurality of anti-sweeping hooks 300, wherein each one of the plurality of anti-sweeping hooks 300 wirelessly communicates with the receiving device 301. In certain embodiments, the receiving device 301 includes at least one of an RF receiver, an audio speaker, and a wireless communication module 356 (shown in FIG. 18), which is configured to wirelessly transmit data (e.g., as an RF signal) received from the anti-sweeping hook 300.

Figure 8:
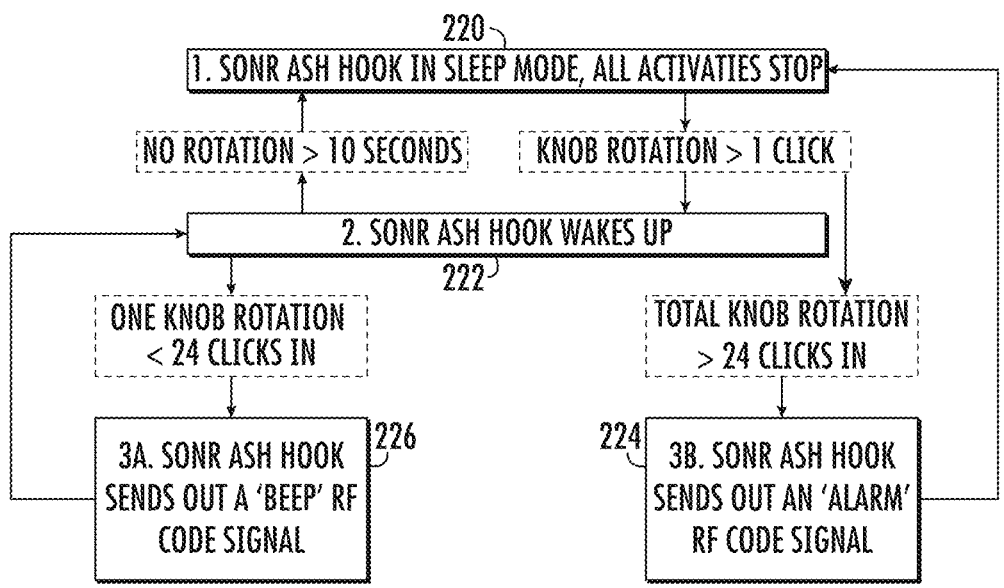
FIG. 8 is a block diagram showing how the circuit of FIG. 7 functions in an exemplary operation of the anti-sweeping hook.

FIG. 8 is a block diagram showing how the circuit 200 of FIG. 7 functions in an exemplary operation of the anti-sweeping hook 100. In the example of FIG. 8, the MCU 202 in circuit 200 starts off in sleep mode in which there is no activity 220. Rotation of the rotating handle 108, such there is at least one electrical connection between the first and second contacts 118, 120, causes the MCU 202 to wake up 222. If the number of electrical connections between the first and second contacts 118, 120 is below some threshold value for a predetermined period of time, the MCU 202 goes back into sleep mode.

In the diagram of FIG. 8, the threshold number of electrical connection between the first and second contacts 118, 120 is 24, and the predetermined period of time is 10 seconds. However, these values may be increased and/or decreased in alternate embodiments of the invention. If the number of electrical connections between the first and second contacts 118, 120 exceeds the threshold value within the predetermined period of time, the MCU 202 triggers an alarm 224. The alarm may take a variety of forms, including but not limited to an audio alarm, a visual alarm via an LED or other lighting means, a wired or wireless signal, such as an RF signal sent to a local or remotely-located receiving device. If the number of electrical connections between the first and second contacts 118, 120 is less than the threshold value, before going into sleep mode the MCU 202 may send an audio signal, such as a beep, or flash the LED, or send a wired or wireless signal to indicate that the MCU 202 is going into sleep mode 226.

Figure 9:
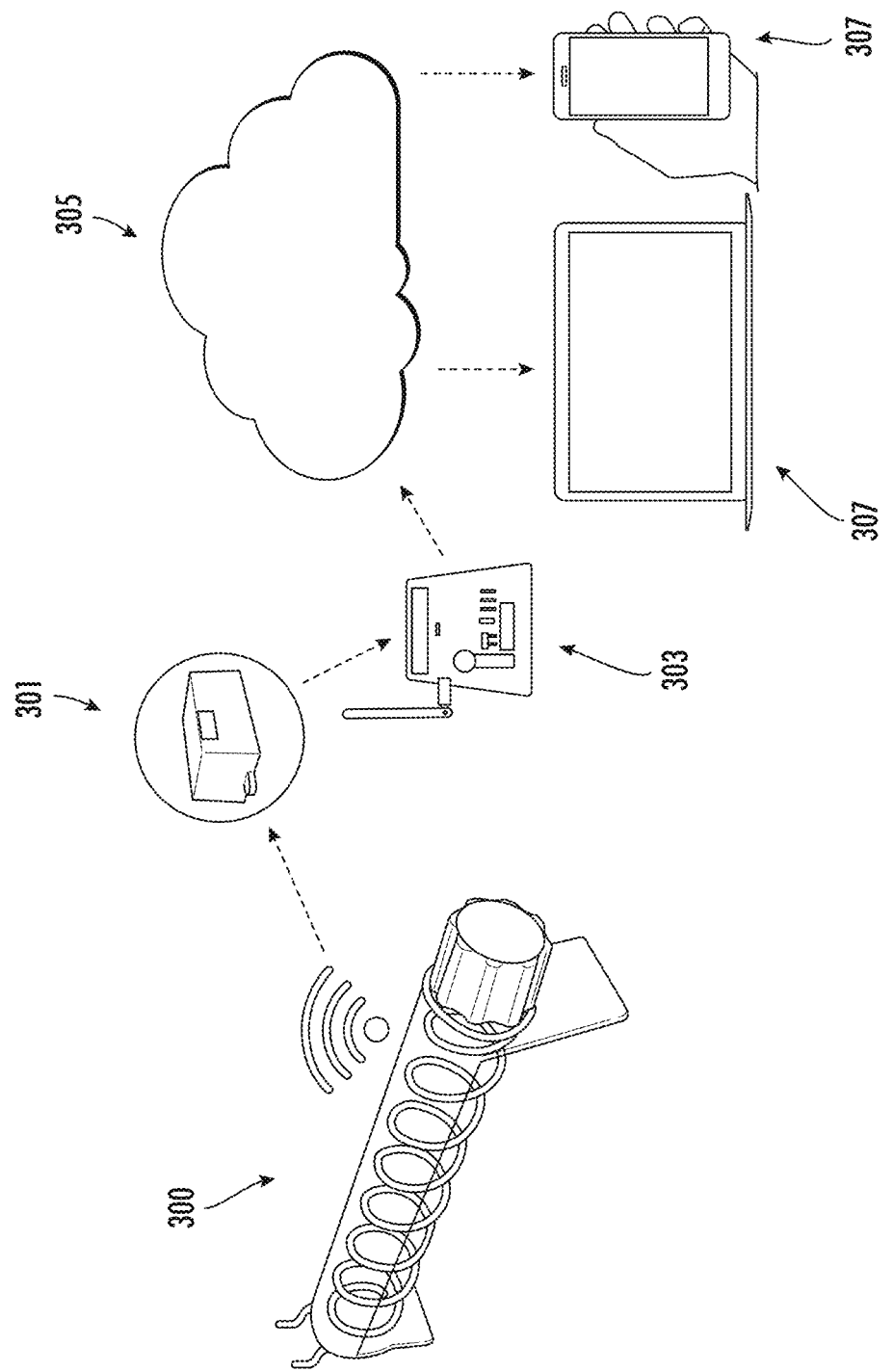
FIG. 9 is a schematic system in which status information of an anti-sweeping hook can be transmitted to a user.

In addition to providing the loss prevention benefits of the anti-sweeping hook 100 described above, some anti-sweeping hooks, such as anti-sweeping hook 300 (also referred to herein as "hook 300") of the system of FIG. 9 can also provide inventory management capabilities. More particularly, the anti-sweeping hook 300 can be used to provide inventory information as to the number of retail items being stored on the anti-sweeping hook 300. In addition to current status of inventory, warnings or other signals related to low stock levels can be sent. The status information can be sent wirelessly, by wire or a combination thereof. The status information can be sent to local devices or remote devices. The status information can be sent via the cloud. Devices such as tablets, computers, handheld smart phones, etc. can be used to access the status information and to receive warning information.

As illustrated in FIG. 9, the anti-sweeping hook 300 communicates with the receiving device 301, wirelessly or via a wired connection. The receiving device 301 can communicate with various devices 307 such as a computer, tablet, phone, or other display device. Further, and as illustrated in FIG. 9, the receiving device 301 can communicate with an internet gateway such as a router or modem 303. Again, this communication can be wired or wireless. In this example, the router or modem 303 can communicate through a public network 305, such as the internet, to a client device 307 such as a computer, tablet phone or other display device so as to communicate inventory data to a user. It should also be recognized that, in the context of this application, "client device" includes, but is not limited to a desktop computer, a laptop computer, a notebook computer, a tablet computer, a smartphone, a smartwatch, or any other suitable device on which a user could view the inventory data.

Typically, the receiving device 301 is on site or local to the anti-sweeping hook 300. Further, while a single hook 300 is illustrated, the receiving device 301 can communicate with a plurality of hooks 300.

The receiving device 301 can receive inventory loss issues such as discussed with regard to hook 100 previously and/or inventory management information such as from the anti-sweeping hook 300.

Figure 10:
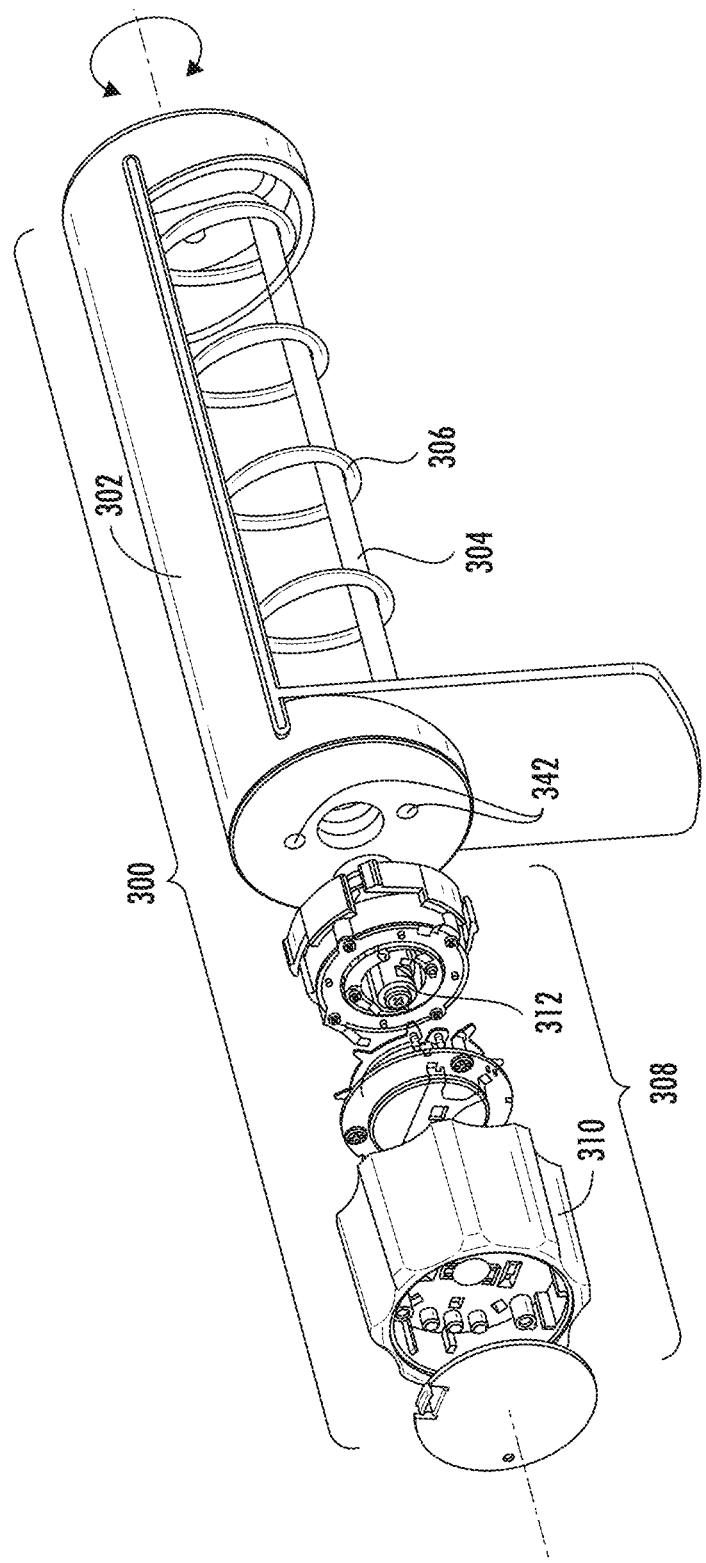
FIG. 10 is a partially exploded perspective view of an anti-sweeping hook with integrated inventory management functionality, constructed in accordance with an embodiment of the invention.

Hook 300 is similar in many respects to hook 100. With reference to FIG. 10, hook 300 includes a housing 302, a display hook 304, a helical coil 306 and a rotating handle 308. The coil 306 is rotatable relative to housing 302 and display hook 304 rotate coil 306 to load or unload retail merchandise from the display hook 304. Loading occurs when rotating the handle 308 in one direction and then unloading occurs when rotating the handle 308 in the opposite direction. The housing, display hook 304 and coil 306 are substantially identical as in hook 100.

The rotating handle 308 has internal electronic componentry that is different than that of rotating handle 108. The electronic componentry may provide to prevent sweeping, or theft, of the productions on the display hook as discussed above. However, the electronic componentry also provides the ability to track and communicate inventory information.

The handle 308 includes a main rotating handle housing 310 that is connected to the coil 306 by a central fastener 312.

Figure 11:
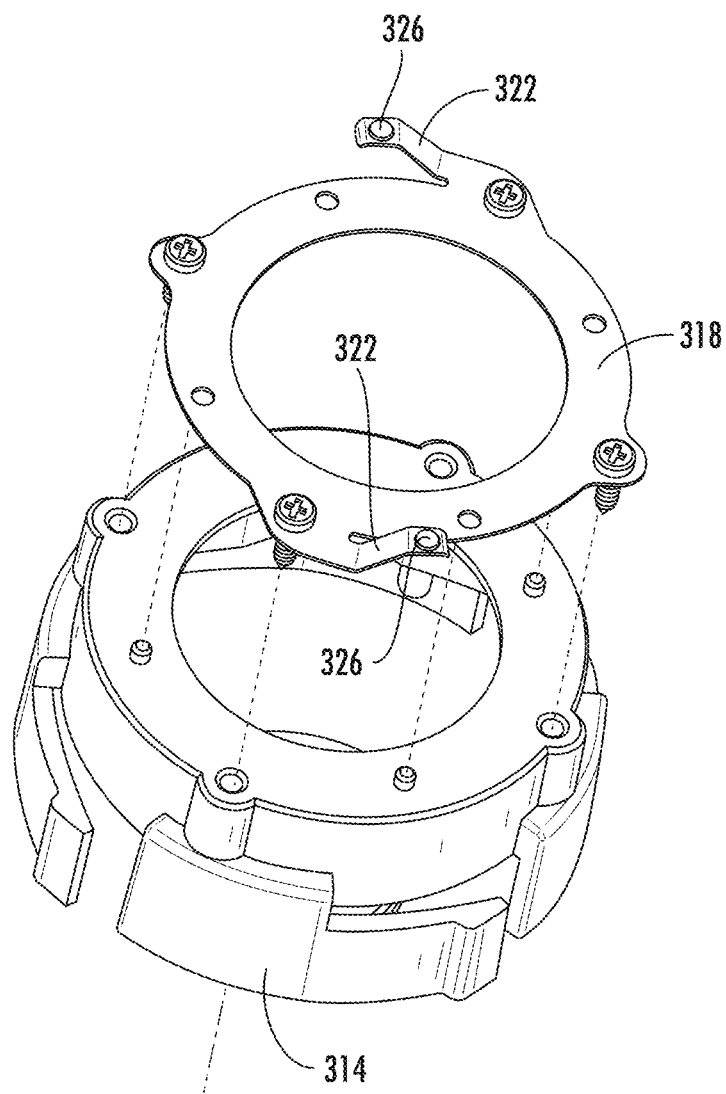
FIGS. 11 and 12 illustrate a rotor and associated contact used with the rotating handle of the anti-sweeping hook of FIG. 10.
Figure 12:
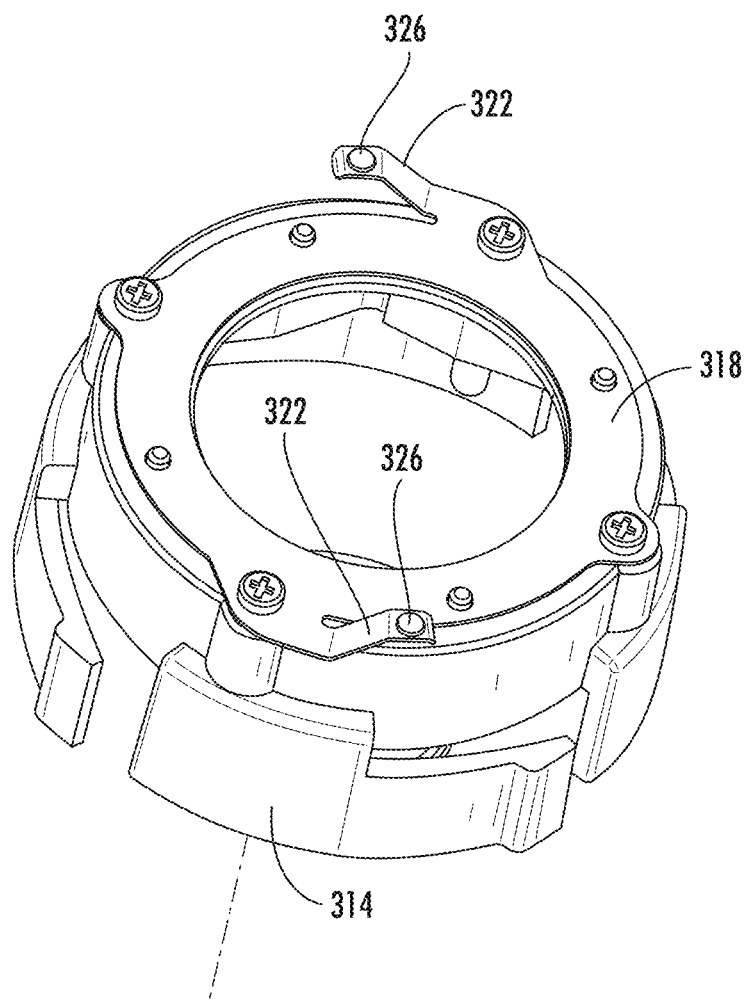
Figure 13:
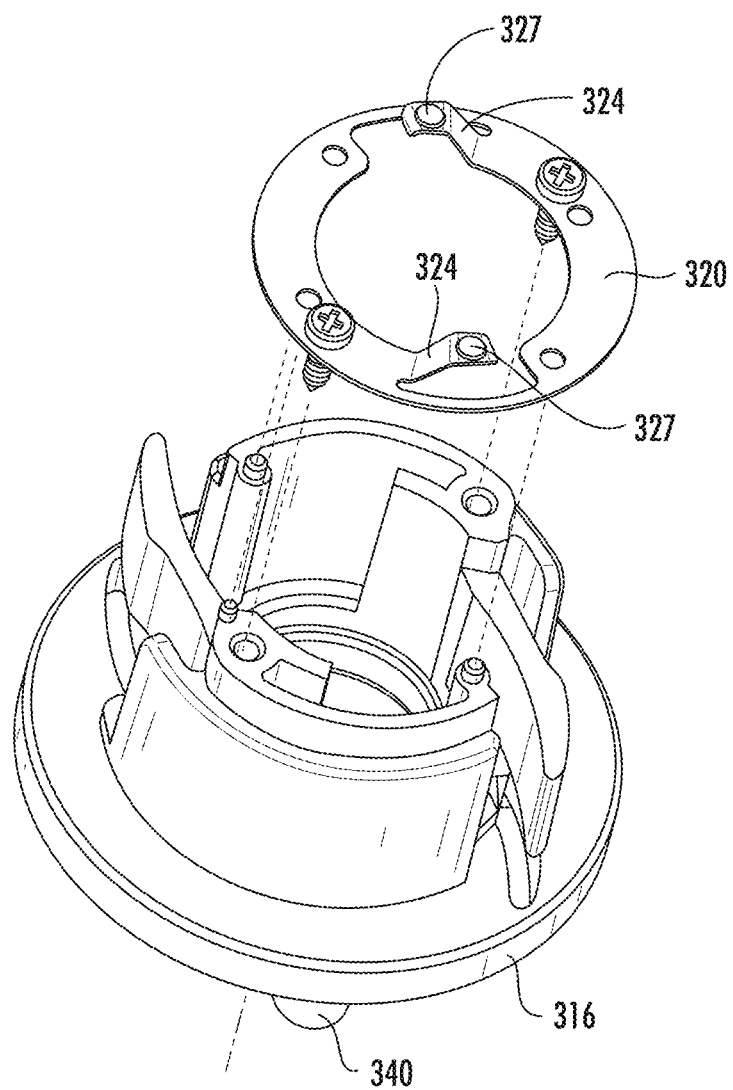
FIGS. 13 and 14 illustrate a stator and associated contact used with the rotating handle of the anti-sweeping hook of FIG. 10.
Figure 14:
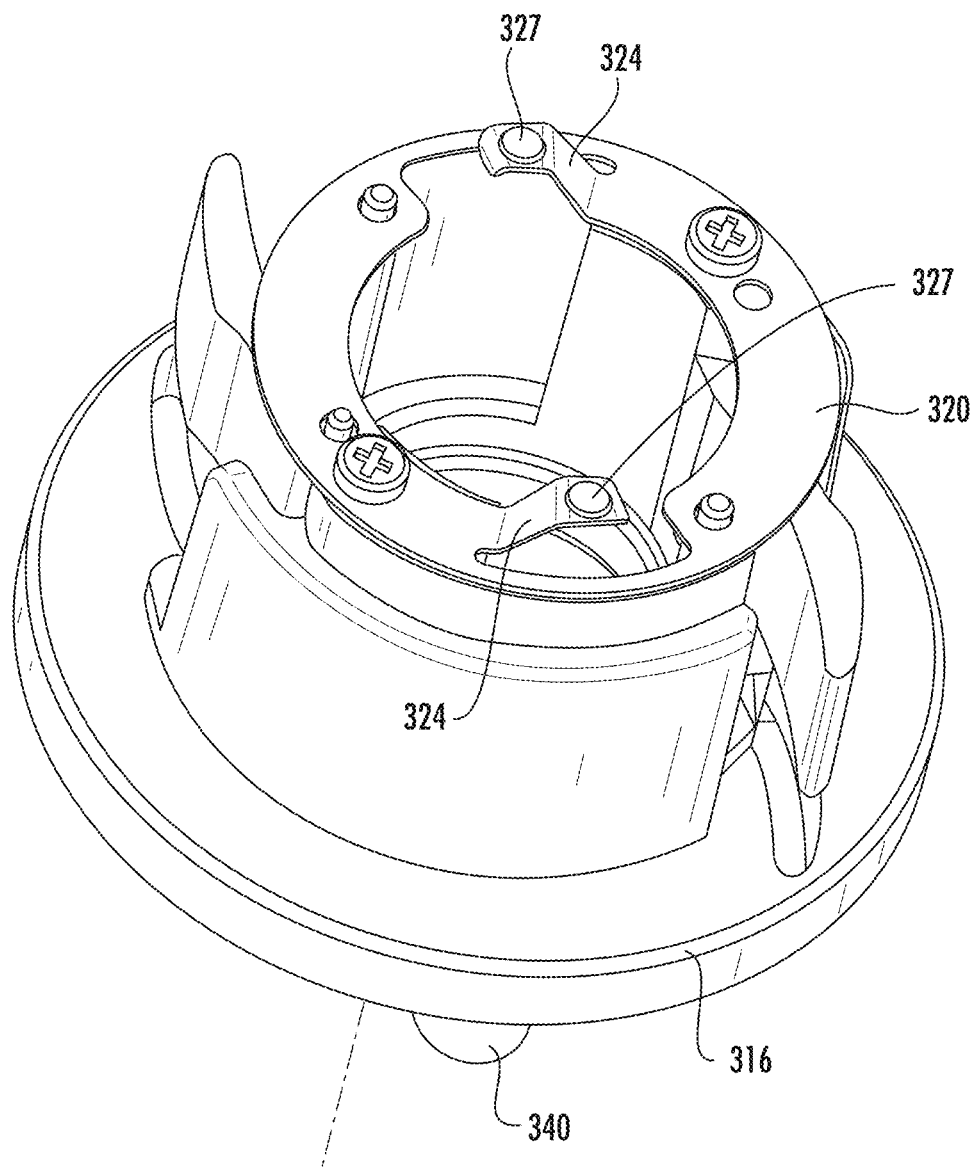
Figure 15:
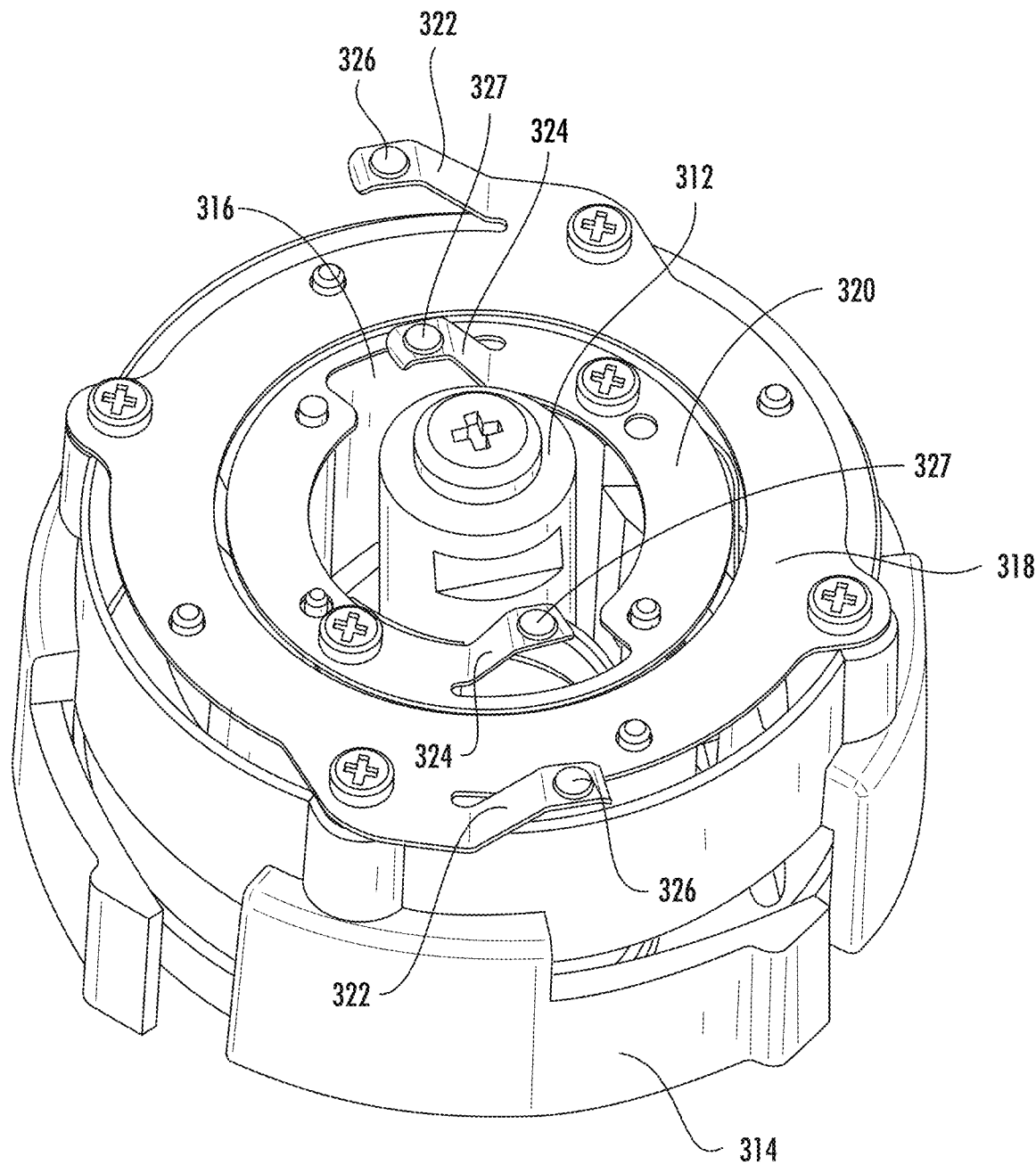
FIG. 15 illustrates the rotor and stator of FIGS. 11-14 assembled.
Figure 16:
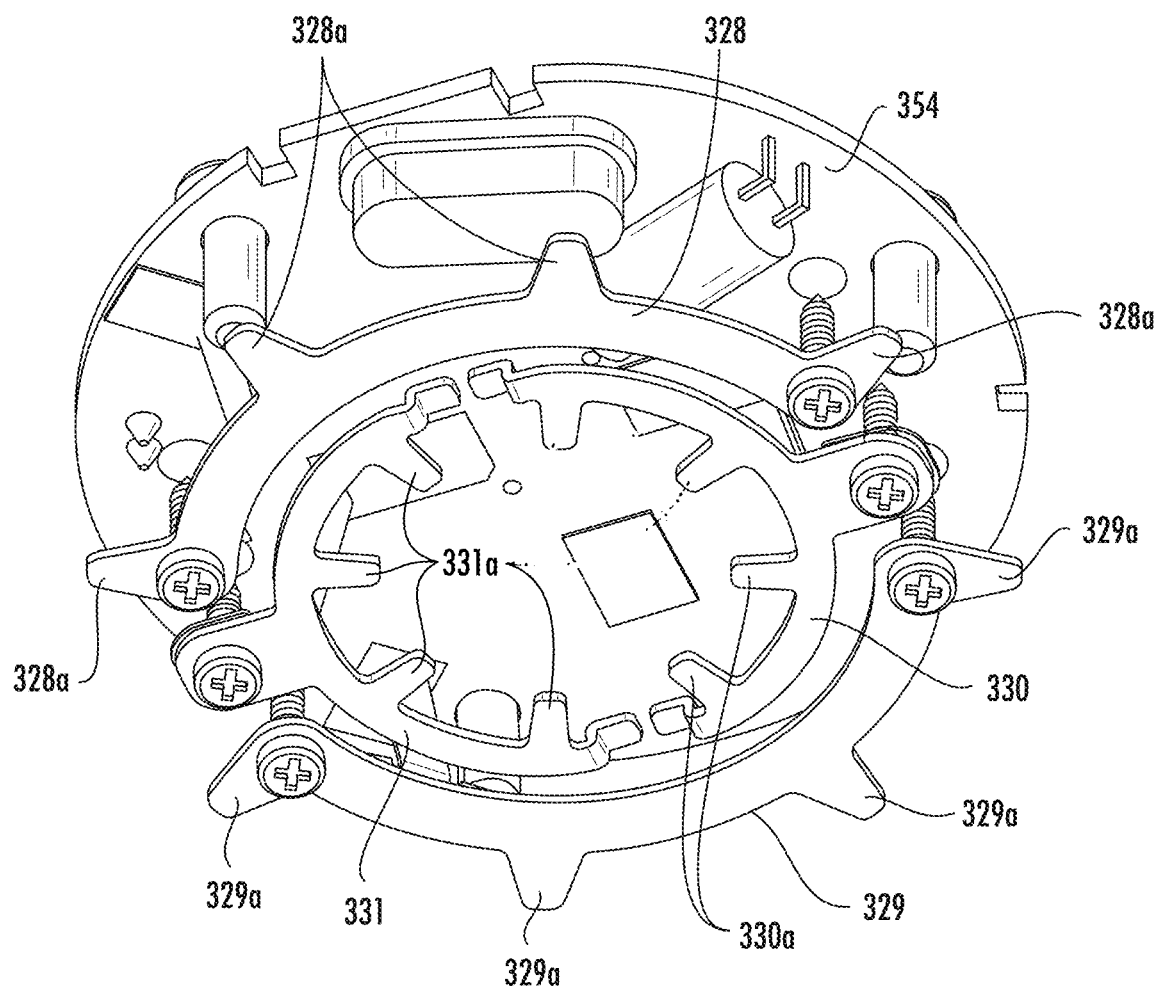
FIG. 16 illustrate contacts and the circuit board carried by a handle housing of the rotating handle of the anti-sweeping hook of FIG. 10.
Figure 17:
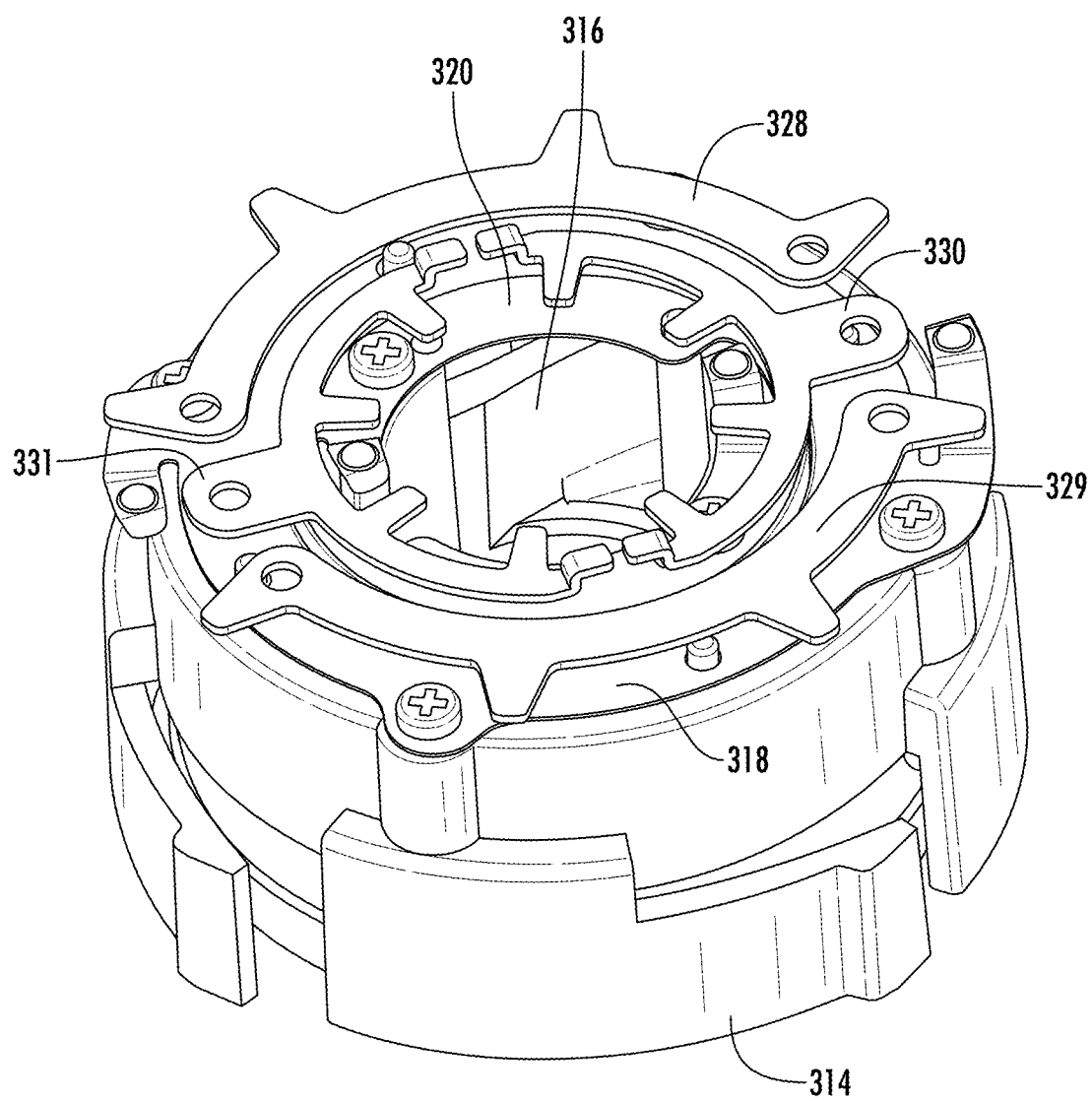
FIG. 17 illustrates the contacts of FIG. 16 relative to the rotor and stator and associated contacts illustrated in FIGS. 11-14.

Similar to the handle housing 110, handle housing 310 houses a rotor 314, which is shown in detail in FIGS. 11 and 12, and a stator 316, which is shown in more detail in FIGS. 13 and 14. The rotor 314 carries a first contact 318 while the stator 316 carries a second contact 320. When the rotor 314 is assembled around stator 316, as illustrated in FIG. 15, the first contact 318 is positioned radially outward from the second contact 320. The first and second contacts 318, 320 are ring like bodies, however, they need not be complete rings. The first contact 318 includes contact fingers 322 and the second contact includes contact fingers 324 each of which have upward-facing bumps 326, 327.

The handle housing 310 carries a first set of contacts 328, 329 and a second set of contacts 330, 331 that are in communication with a circuit board 354. The first set of contacts 328, 329 are part of a first circuit while the second set of contacts 330, 331 are part of a second circuit. Notably, contacts 328, 329 are isolated from one another and contacts 330, 331 are isolated from one another. When the handle housing 310 is rotated, contacts 328-331 rotate with the handle housing.

Each of the contacts 328, 329, 330, 331 have a plurality of radially extending contact lobes 328a, 329a, 330a, 331a. All of the lobes 328a, 329a of the first set of contacts 328, 329 are substantially equally angularly spaced apart while all of the lobes 330a, 331a of the second set of contacts 330, 331 are substantially equally angularly spaced apart. Further, the first set of contacts 328, 329 has a same number of lobes as the second set of contacts 330, 331.

In operation, the lobes 328a, 329a are radially spaced from the rotational axis of the handle 308 a same distance as upward facing bumps 326 of contact fingers 322 and the lobes 330a, 331a are radially spaced from the rotational axis of the handle 308 a same distance as upward facing bumps 327. As such, when the rotating handle housing 310 rotates relative to the stator 316 and/or rotor 314, the first and second contacts 318, 320 will selectively complete the first and second circuits.

In this example, the stator 316 is rotationally fixed to the housing 302. More particularly, stator 316 has nibs 340 (FIGS. 13 and 14) that extend into recesses 342 (FIG. 10) of the housing 302 to prevent relative rotation therebetween. The rotor 314 is permitted to rotate relative to stator 316 in only a single first direction.

The rotating handle housing 310 is configured to engage the rotor 314, similar to handle 108, such that when the rotating handle housing 310 rotates in the first direction, the rotating handle housing 310 engages rotor 314 and causes it to rotate in the first direction relative to stator 316. However, when the rotating handle housing 310 is rotated in an opposite second direction, the stator 316 engages the rotor 314 such that the rotor 314 will not rotate relative to the stator 316, but the rotating handle housing 310 will rotate relative to the stator 316 and 314, which are rotationally fixed to one another.

Thus, as the rotating handle housing 310 rotates in the first direction, the second contact 320 will selectively connect and disconnect inner contacts 330, 331 as the fingers 327 selective contact opposed ones of the lobes 330a, 331a that are 180 degrees apart from one another. This will selectively make and break the inner circuit that includes contacts 330, 331.

However, as noted above, when the rotating handle housing 310 is rotated in the first direction, the rotor 314 rotates with the rotating handle housing 310 relative to stator 316. Because the rotor 314 rotates with rotating handle housing 310, the rotor 314 does not change its angular position relative to rotating handle housing 310 or contacts 328, 329 carried thereby. As such, the outer circuit that includes contacts 328, 329 stays steady state of either constantly broken or constantly made. Therefore, when the rotating handle housing 310 is rotated in the first direction, the circuit board 354 will sense only changes in the inner circuit that includes contacts 330, 331. The data gathered by the circuit board 354 may be relayed and processed by the MCU 202.

When the rotating handle housing 310 is rotated in the second direction, rotor 314 is engaged by stator 316 such that rotor 314 remains angularly fixed relative to stator 316. Thus, the angular position of the rotating handle housing 310 now changes with respect to both the rotor 314 and the stator 316. As such, as the rotating handle housing 310 rotates, the inner contacts 330, 331 are repeatedly electrically connected and disconnected from one another by second contact 320 carried by the stator 316 like when rotation occurs in the first direction but now the outer contacts 328, 329 are repeatedly electrically connected and disconnected from one another by first contact 318 carried by the rotor 314. Thus, when the rotating handle housing 310 is rotated in the second direction, the circuit board 354 will sense changes in both the inner circuit that includes contacts 330, 331 as well as the outer circuit that includes contacts 328, 329. As in the example above, the data gathered by the circuit board 354 may be relayed and processed by the MCU 202.

Notably, when the legs 322, 324 are positioned angularly between adjacent, corresponding, lobes 328a, 329a, 330a, 331a, the corresponding circuits are broken and when the legs 322, 324 contact lobes 328a, 329a, 330a, 331a, the corresponding circuits are made.

Thus, the circuit board 354, and more specifically in some embodiments, the MCU 202 can determine which direction the rotating handle housing 310 is being rotated by determining which circuits are being repeatedly connected and disconnected. Further, by counting the number of connections and disconnections, the degree of rotation (or number of rotations) of the coil 306 can be determined. As such, by being able to determine how much rotation as well as in which direction, the circuit board 354 or MCU 202 can now determine if retail merchandise is being loaded or unloaded onto the display hook 304 as well as how much merchandise is being loaded or unloaded onto the display hook 304, e.g., a change in the number of retail items stored on the display hook 304.

Again, this information can also be used to determine if a theft or sweeping event is occurring by determining the rate at which the rotating handle housing 310 is rotated and the direction in which it is being rotated.

Figure 18:
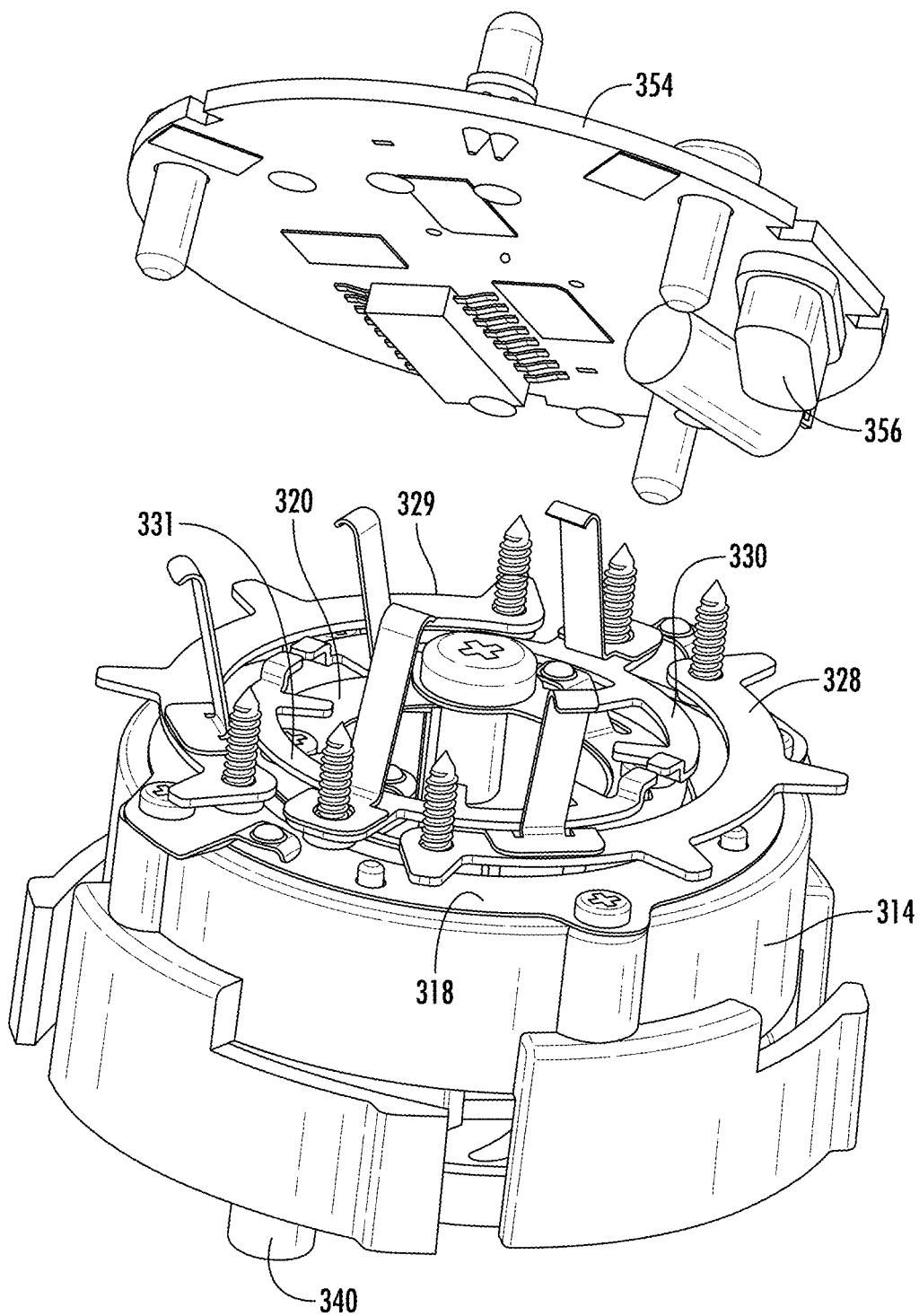
FIG. 18 illustrates the electronic components within the rotating handle of the anti-sweeping hook of FIG. 10.

With reference to FIG. 18, circuit board 354 includes a communication module 356 that communicates sensed data to the communication box. The communication module 356 is configured to use wireless communication to communicate with the receiving device 301, using any appropriate protocol, such as Wi-Fi, Bluetooth, Zigbee, Z-wave, DigiMesh, 6LowPan, Thread, WirelessHart, Dash7, Weightless, ANT, Ingenu, LoRaWan, any of the various cellular protocols, conventional radio, sonar, etc. However, it is envisioned that the merchandise hook could also include the appropriate hardware for wired communication to communicate the information (inventory data, sweeping, theft, product loading or product unloading) gathered by circuit board 354 to the receiving device 301 via a wired connection. The same wakeup and sleep features as discussed above can be provided in the anti-sweeping hook 300.

Figure 19:
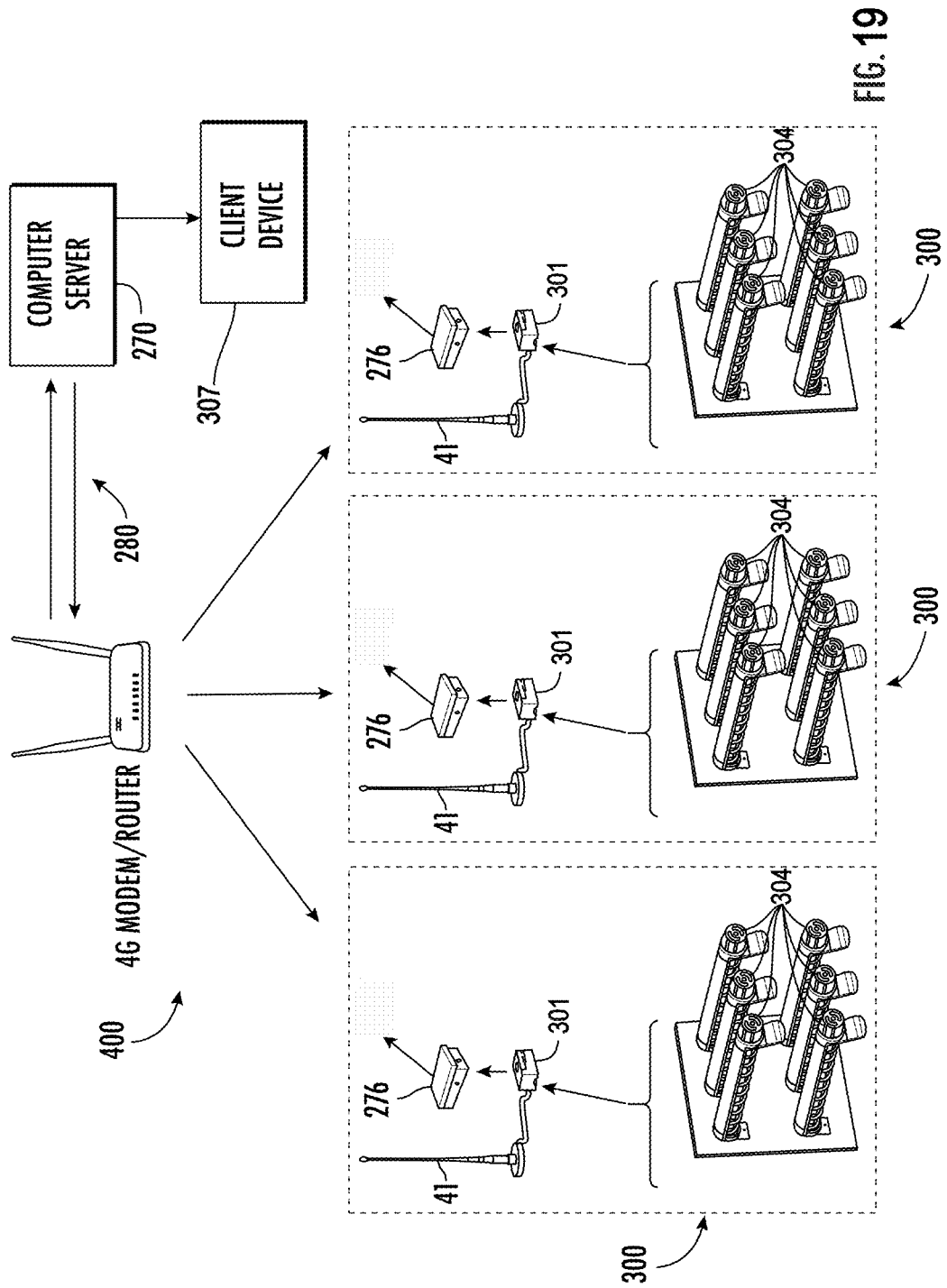
FIG. 19 is a schematic diagram for an anti-sweeping hook system, constructed in accordance with an embodiment of the invention.

Referring now to FIG. 19, it can be seen that in certain aspects, embodiments of the invention provide an anti-sweeping hook system 400 that includes an anti-sweeping hook 300. The anti-sweeping hood has a display hook 304 for storing a retail item. The display hook 304 may be substantially straight and have a first end and a second end opposite the first end. A helical coil 306 is disposed about the display hook 304 and extends along a lengthwise portion of the display hook 304. The helical coil 306 has a first coil end proximate the first end of the display hook 304. Rotation of the helical coil 306 in a first direction loads the retail item onto the display hook 304, and rotation of the helical coil 306 in a second direction opposite the first direction removes the retail item from the display hook 304. A rotating handle 308 is attached to the first end of the display hook 304 and to the first coil end. The rotating handle 308 is configured to determine a change in a number of retail items stored on the display hook 304 based on the number, degree, or extent of rotation and on the direction of rotation of the rotating handle 308. The rotating handle 308 includes an MCU 202 and a wireless communications module 356 configured to process and wirelessly transmit inventory data indicating the number of retail items stored on the display hook 304.

In a particular embodiment, the rotating handle 308 includes a first contact 118 and a second contact 120 disposed within the main housing 310 of the rotating handle 308 such that an electrical connection between the first and second contacts 118, 120 indicates some rotation of the rotating handle 308. In some embodiments, the rotating handle 308 includes a rotor 314 and stator 316 each disposed within the main housing 310 of the rotating handle 308. The first contact 118 is attached to the main housing 310, and the second contact 120 is attached to the rotor 314. The rotor 314 and stator 316 are configured such that rotation of the rotor 314 in a first direction prevents any electrical connection between the first and second contacts 118, 120, and rotation of the rotor 314 in a second direction opposite the first direction facilitates electrical connections between the first and second contacts 118, 120.

In embodiments of the anti-sweeping hook system 400, the MCU 202 is configured to determine the number of retail items stored on the display hook 304 based on a number of electrical connections made by the first and second contacts 118, 120. Additionally, the MCU 202 may be further configured to transmit a unique identifier for the anti-sweeping hook 300. In certain embodiments, the anti-sweeping hook 300 includes either an RFID reader, a UPC reader, or a QR code scanner to automatically scan an RFID tag, a UPC or QR code on each retail item. In certain embodiments, the anti-sweeping hook 300 uses the RFID reader, a UPC reader, or a QR code scanner to automatically determine the number of retail items on the display hook 304. In other embodiments, after loading the display hook 304 with merchandise, a user inputs the number of retail items on the display hook 304. Alternatively, the anti-sweeping hook 300 could be put into a mode (e.g., a "loading" mode) such that during loading of merchandise, the anti-sweeping hook 300 counts the number of rotations of the helical coil 306 in the "loading" direction, and for each rotation adds to the count of retail items. Similarly, in a "retail" mode, the anti-sweeping hook 300 reduces the count of retail items for each rotation of the helical coil 306 in the "unloading" direction.

Embodiments of the invention further include a remotely-located receiving device 301 configured to receive inventory data from the wireless communications module 356, and to transmit the inventory data to an upper-level system controller 276. The receiving device 301 may be configured to transmit, along with the inventory data, a unique identifier for the receiving device 301. Additionally, the receiving device 301 may include an external antenna 41, such that the receiving device 301 can receive data from the anti-sweeping hook 300 at distances up to 200 feet from the receiving device 301. Without the external antenna 41, the receiving device 301 would still be able to receive data from the one or more anti-sweeping hooks 300, but only from anti-sweeping hooks 300 located about 20 to 30 feet from the receiving device 301.

The anti-sweeping hook system 400 may further include an upper-level system controller 276 configured to receive the inventory data, and to transmit the inventory data to a networked computer server 270. In certain embodiments, the upper-level system controller 276 is configured to transmit, along with the inventory data, a unique identifier for the upper-level system controller 276. Furthermore, the upper-level system controller 276 may be configured to receive data from the computer server 270. Further still, the data received from the computer server 270 may include a software update for the upper-level system controller 276, or for the receiving device 301, or for the MCU 202. In some embodiments, the upper-level system controller 276 is configured to communicate directly with the MCU 202 via the wireless communications module 356. In other embodiments, the upper-level system controller 276 includes one or more visual indicators configured to indicate whether the upper-level system controller 276 is receiving power, or transmitting data, or receiving data.

The MCU 202 may be configured to repeat each wireless transmission of inventory data at least once. Repeating the wireless transmission ensures that the receiving device 301 or the upper-level system controller 276 receives and properly recognizes and processes the wireless signal from the MCU 202. If the first transmission is not recognized, a second or third transmission makes it likely that one of the transmissions will be received. Embodiments of the anti-sweeping hook system 400 further include a networked computer server 270 configured to receive and aggregate the inventory data transmitted by the MCU 202. In particular embodiments, the inventory data is transmitted from the MCU 202 to an upper-level system controller 276 which then transmits the inventory data to the computer server 270. The MCU 202 may be configured to transmit the inventory data to an upper-level controller 276, which is configured to transmit the inventory data via a network link 280 to the computer server 270. In a particular embodiment, communication via the network link 280 comprises communication via the internet, or via an intranet, or via an extranet.

In yet another aspect, embodiments of the invention provide a retail inventory management system that includes the anti-sweeping hook system 400 described above, and a computer server 270 configured to receive and aggregate the inventory data transmitted by the MCU 202. The computer server 270 is linked to a network 280 and further configured to send the inventory data to a display of a client device 307. The computer server 270 is configured to transmit inventory data to the display, in real-time, such that the display shows the inventory data from a plurality of anti-sweeping hooks 300. In particular embodiments, the computer server 270 causes the display to show the inventory data both graphically and textually. FIGS. 20-23 show example of these graphical and textual displays. More specifically, FIGS. 20-23 are exemplary screen shots that illustrating some of the displays provided by the computer server 270 to a client device 307 of a user.

In inventory management, a stock keeping unit (SKU) is the unit of measure in which the stocks of a material are managed. The SKU is usually represented by an alphanumeric string of characters, but may also be printed and attached to a retail item, or to the packaging for a retail item, as a scannable bar code. The alphanumeric characters of the SKU make up a code that allows the merchant to track the price, product detail, manufacturer, and point-of-sale for the retail item. Typically, each unique product has its own unique SKU number.

A UPC, or universal product code, is a numeric code (usually a 12-digit string) that is attached to products wherever they are sold, for external use. The UPC serves a purpose similar to that of the SKU but, generally, a product has the same UPC no matter where, or by whom, it is sold, whereas different merchants tend to assign their own unique SKU. In this way, SKUs are typically unique to a single retailer.

Figure 20:
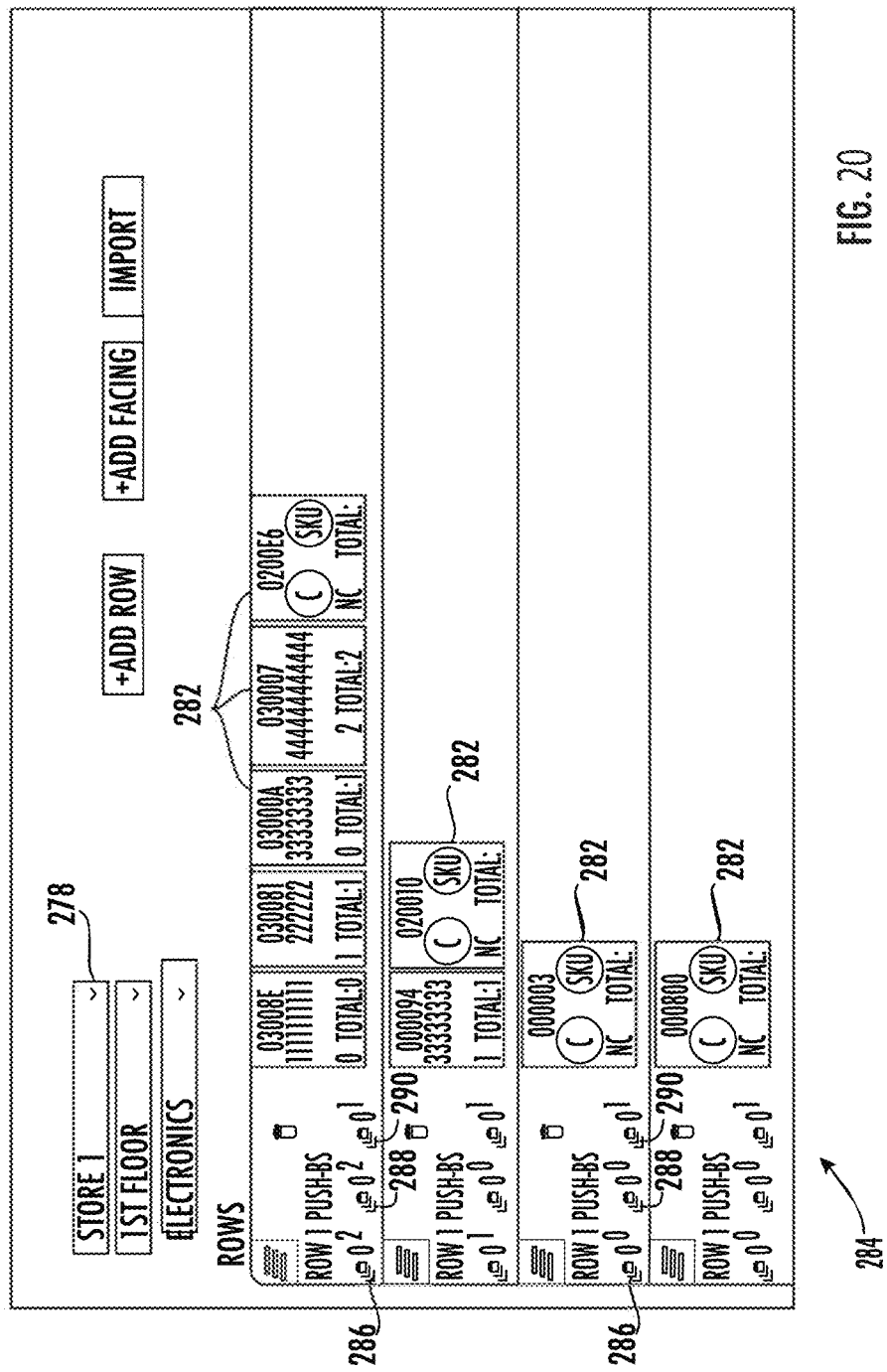
FIG. 20 is an exemplary screen shot of a graphic display provided by the computer server to a client device, the display showing the amount of inventory by row or shelf in a store, in accordance with an embodiment of the invention.

FIG. 20 is an exemplary screen shot of a graphic display provided by the computer server 270 to a client device 307, where the display shows the amount of inventory by row or shelf in a store 278, in accordance with an embodiment of the invention. In certain embodiments, the computer server 270 is configured to transmit inventory data to the display, in real-time, indicating a number of retail items, for a particular SKU, disposed on each anti-sweeping hook 300 in a section of a particular store 278. In other embodiments, the computer server 270 is configured to transmit inventory data to the display, in real-time, indicating a number of retail items, for a particular SKU, disposed on one or more anti-sweeping hooks 300 in a particular store 278. In a further embodiment, the computer server 270 is further configured to transmit inventory data to the display, in real-time, indicating the number of retail items, disposed on the one or more anti-sweeping hooks 300 in each store 278 of a plurality of stores 278.

Figure 21:
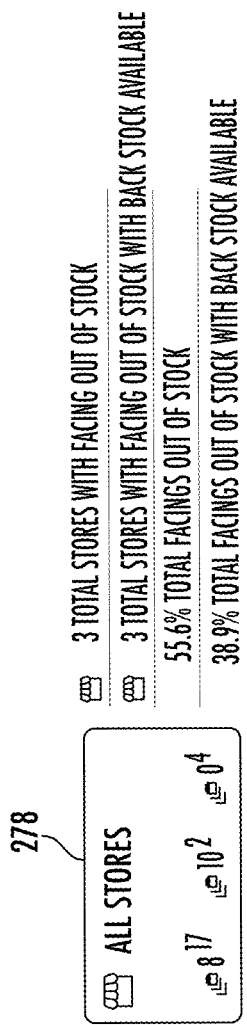
FIG. 21 is an exemplary screen shot of a graphic display provided by the computer server to a client device, the display showing the amount of inventory for all stores served by the retail inventory management system, in accordance with an embodiment of the invention.
Figure 22:
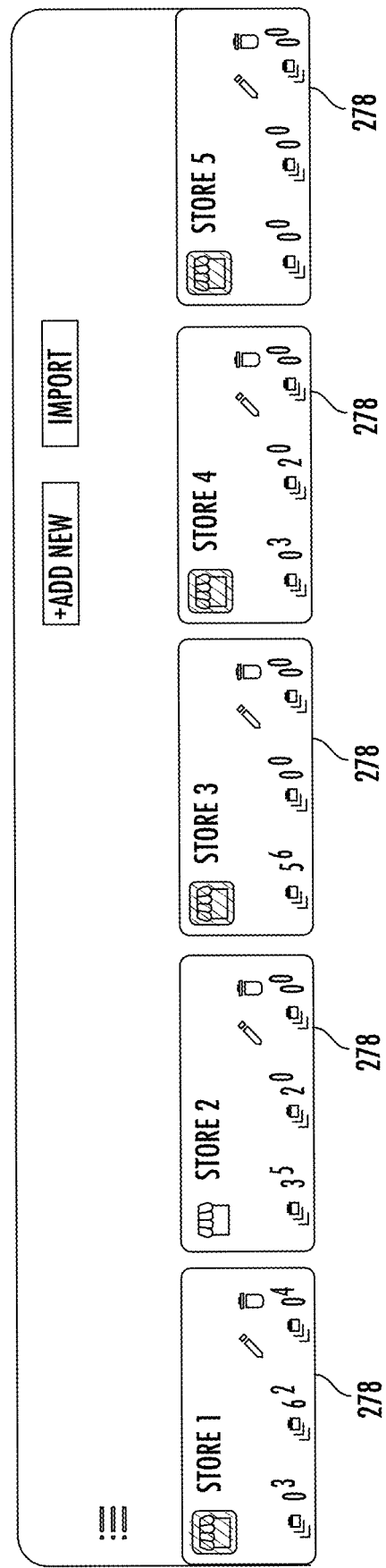
FIG. 22 is an exemplary screen shot of a graphic display provided by the computer server to a client device, the display showing the amount of inventory for specific stores served by the retail inventory management system, in accordance with an embodiment of the invention.

FIG. 21 is an exemplary screen shot of a graphic display provided by the computer server 270 to a client device 307, in which the display shows the amount of inventory for all stores served by the retail inventory management system, in accordance with an embodiment of the invention, while FIG. 22 is an exemplary screen shot of a graphic display provided by the computer server 270 to the client device 307, the display showing the amount of inventory for specific stores 278 served by the retail inventory management system 400, in accordance with an embodiment of the invention. As can be seen from the exemplary displays of FIGS. 21 and 22, the computer server 270 may be configured to transmit inventory data to the display, in real-time, indicating the number of retail items, for a plurality of SKUs, disposed on one or more anti-sweeping hooks 300 in a particular store 278. Furthermore, the computer server 270 may be further configured to transmit inventory data to the display, in real-time, indicating the number of retail items, a plurality of SKUs, disposed on the one or more anti-sweeping hooks 300 in each store 278 of a plurality of stores 278. In some embodiments, the computer server 270 is configured to transmit inventory data to the display, in real-time, indicating a number of backstock items for the particular SKU in the particular store 278. Additionally, the computer server 270 may be further configured to transmit inventory data to the display, in real-time, indicating the number of backstock items for a plurality of SKUs in each store 278 of a plurality of stores 278. Further still, the computer server 270 may be configured to automatically prompting a user to restock the one or more anti-sweeping hooks 300 using backstock items for one or more SKUs in one or more of the plurality of stores 278. It is envisioned that embodiments of the retail inventory management system 400 are able to track and manage the inventory for dozens or even hundreds of stores, and for thousands or even millions of individual anti-sweeping hooks 300.

The exemplary screen shot of FIG. 20 shows a display in which the inventory for a store is broken down by row and fixture-type. FIG. 20 indicates that Row 1 has two anti-sweeping hooks 300, and five pusher assemblies. In the screen shot of FIG. 20, each row has one box 282 for each anti-sweeping hook 300 or pusher assembly in that row of the store 278. At the top of each box 282, the SKU number and a user-specified descriptor identify the retail item on that particular anti-sweeping hook 300 or pusher assembly. At the bottom of the box 282 is the number of retail items on the anti-sweeping hook 300 or pusher assembly, and a total number that adds the number of retail items on the anti-sweeping hook 300 or pusher assembly and the number of retail items in backstock.

In a column 284 to the left of the boxes 282, the display shows aggregated or total number for the items on that row. The column 284 includes icons, which may be color-coded to categorize the retail items in that row. The first icon 286 is next to the number of customer-facing (i.e., on anti-sweeping hooks 300 or pusher assemblies) retail items for that row. The second icon 288 is next to the number of backstock items for the SKUs in that row. The third icon 290 indicates an error coding, and indicates the number of devices that are not calibrated, or has incorrect SKU information assigned to the device. The display page of FIG. 20 also includes dropdowns that allow the user to choose the store, section of the store, and department whose inventory is to be displayed.

Referring again to FIG. 20, In certain embodiments, the computer server 270 is configured to transmit inventory data to the display, in real-time, indicating a number of backstock items for the particular SKU in the particular store 278. However, the computer server 270 may also be configured to transmit inventory data to the display, in real-time, indicating the number of backstock items for a plurality of SKUs in each store 278 of a plurality of stores 278. Further still, the computer server 270 may be configured to automatically prompting a user to restock the one or more anti-sweeping hooks 300 using backstock items for one or more SKUs in one or more of the plurality of stores 278.

The computer server 270 is also configured to provide displays in more traditional formats. Some displays may not use the icons and other graphical tools shown in FIGS. 20-23. For example, FIG. 24 is an exemplary screen shot of a graphic display provided by the computer server 270 to a client device 307, the display showing an inventory count by store 278 and department, in which the display uses a database table-based format which mainly uses text with only a few graphic icons, according to an embodiment of the invention. Similarly, FIG. 25 is an exemplary screen shot of a graphic display provided by the computer server 270 to a client device 307, the display showing an inventory count by brand and product description, where the display provides a database table-based format primarily using text with minimal icon usage, in accordance with an embodiment of the invention.

In particular embodiments, the computer server 270 is configured to transmit inventory data to the display, in real-time, indicating a number of each retail item, for an entire department or category of retail items, disposed on one or more anti-sweeping hooks 300 in a particular store 278. In other embodiments, the computer server 270 is configured to transmit inventory data to the display, in real-time, indicating the number of each retail item, for the entire department or category of retail items, disposed on the one or more anti-sweeping hooks 300 in each store 278 of a plurality of stores 278.

The computer server 270 may also be configured to transmit inventory data to the display, in real-time, indicating a number of SKUs which are out-of-stock at a particular store 278. In some embodiments, the computer server 270 is configured to transmit inventory data to the display, in real-time, indicating each store 278 of a plurality of stores 278 where at least one SKU is out-of-stock. In other embodiments, the computer server 270 is configured to automatically generate a purchase order for an out-of-stock SKU, or to automatically generate an alert prompting a user to create the purchase order.

Figure 23:
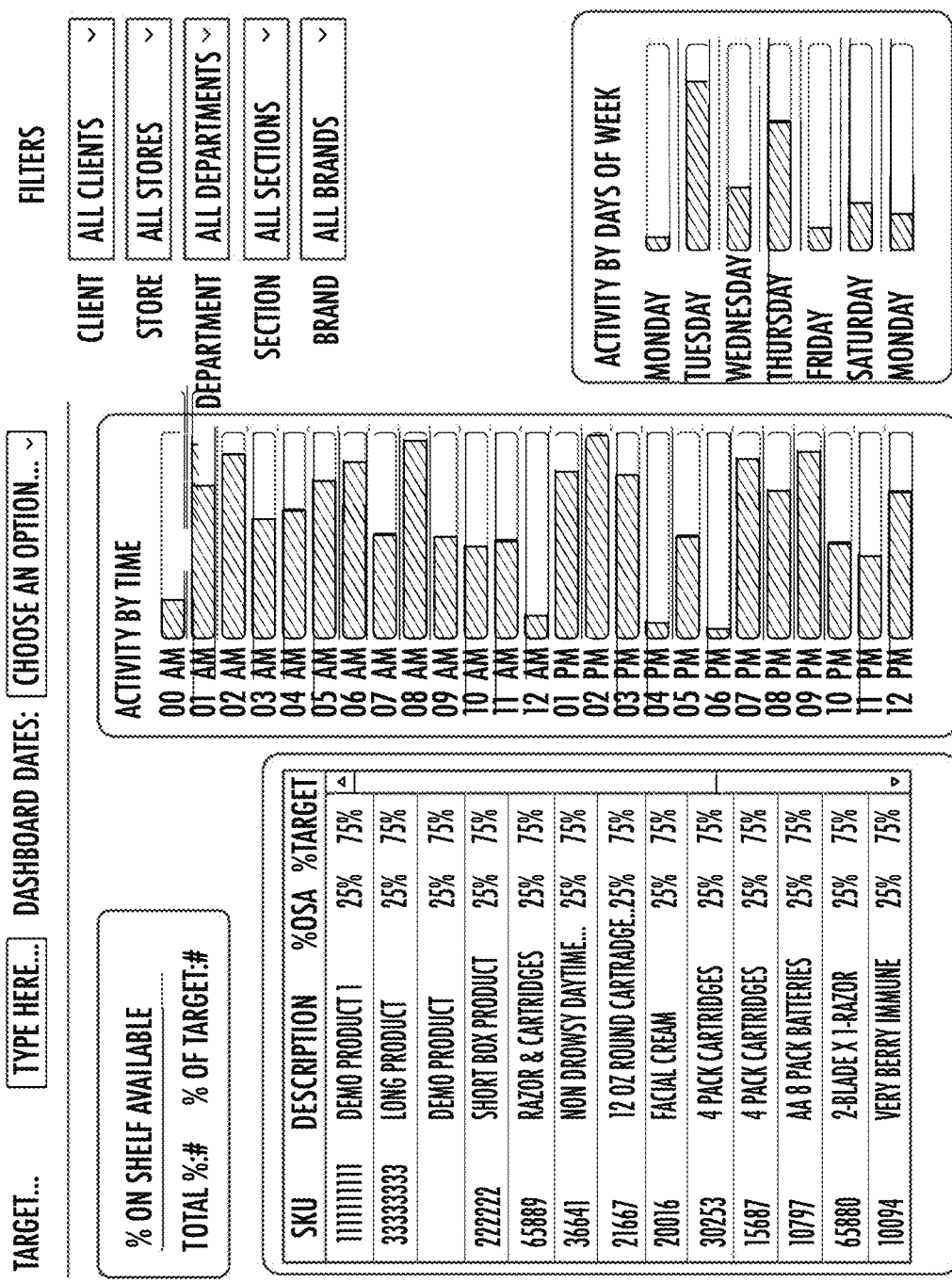
FIG. 23 is an exemplary screen shot of a graphic display provided by the computer server to a client device, the display showing the rate of inventory usage by day and by hour, in accordance with an embodiment of the invention.

FIG. 23 is an exemplary screen shot of a display provided by the computer server 270 to a client device 307, the display showing the rate of inventory usage by day and by hour, in accordance with an embodiment of the invention. In other embodiments, the computer server 270 is configured to calculate and transmit inventory data to the display indicating a rate of inventory usage for one or more SKUs, or for one or more stores 278. The computer server 270 may be configured to calculate and transmit inventory data to the display indicating a rate of inventory usage by hour of the day, day of the week, week of the month, or month of the year. As can be seen from FIG. 23, the user may access this rate of inventory usage for a particular store, department, category, brand, or client. Further still, the computer server 270 may be configured to analyze trends in the rate of inventory usage in order to determine when inventory at a particular store 278 is to be replenished.

FIG. 26 is an exemplary screen shot of a display provided by the computer server 270 to a client device 307, the display showing the identity, contact information, and authorization level for individual users, in accordance with an embodiment of the invention. In certain embodiments, the computer server 270 is configured to transmit inventory data, simultaneously and in real-time, to a plurality of displays located locally or remotely from the computer server 270. Additionally, the computer server 270 may be configured with multiple levels of access for users, wherein each access level has different privileges associated therewith. In some embodiments, the client device 307 is one of a desktop computer, a laptop computer, a notebook computer, a tablet computer, a smartphone, or a smartwatch.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anti-sweeping hook system comprising:
   an anti-sweeping hook that includes:
      a display hook for storing a retail item, the display hook having a first end and a second end opposite the first end;
      a helical coil disposed about the display hook and extending along a lengthwise portion of the display hook, the helical coil having a first coil end proximate the first end of the display hook, wherein rotation of the helical coil in a first direction loads the retail item onto the display hook, and rotation of the helical coil in a second direction opposite the first direction removes the retail item from the display hook; and a rotating handle attached to the first coil end, wherein the rotating handle is configured to determine a change in a number of retail items stored on the display hook based on the number of rotations or extent of rotation, and direction of rotation of the rotating handle, wherein the rotating handle includes an MCU and a wireless communications module together configured to process and wirelessly transmit inventory data indicating the number of retail items stored on the display hook, or indicating a change in the number of retail items stored on the display hook;

wherein the rotating handle includes a first contact and a second contact disposed within a main housing of the rotating handle such that an electrical connection between the first and second contacts indicates some rotation of the rotating handle.

2. The anti-sweeping hook system of claim 1, wherein the rotating handle includes a rotor and stator each disposed within the main housing of the rotating handle, the first contact attached to the main housing, and the second contact attached to the rotor, the rotor and stator configured such that rotation of the rotor in a first direction prevents any electrical connection between the first and second contacts, and rotation of the rotor in a second direction opposite the first direction facilitates electrical connections between the first and second contacts.

3. The anti-sweeping hook system of claim 1, wherein the MCU is configured to determine the number of retail items stored on the display hook based on a number of electrical connections made by the first and second contacts.

4. The anti-sweeping hook system of claim 1, wherein the MCU is further configured to transmit a unique identifier for the anti-sweeping hook.

5. The anti-sweeping hook system of claim 1, wherein the anti-sweeping hook includes either an RFID reader, a UPC reader, or a QR code scanner to automatically scan an RFID tag, a UPC or QR code on each retail item.

6. The anti-sweeping hook system of claim 1, further comprising a remotely-located receiving device configured to receive inventory data from the wireless communications module, and to transmit the inventory data to an upper-level system controller.

7. The anti-sweeping hook system of claim 6, wherein the receiving device is configured to transmit, along with the inventory data, a unique identifier for the receiving device.

8. The anti-sweeping hook system of claim 6, wherein the receiving device includes an external antenna, and wherein the receiving device can receive data from the anti-sweeping hook at distances up to 200 feet from the receiving device.

9. The anti-sweeping hook system of claim 1, further comprising an upper-level system controller configured to receive the inventory data, and to transmit the inventory data to a networked computer server.

10. The anti-sweeping hook system of claim 9, wherein the upper-level system controller is configured to transmit, along with the inventory data, a unique identifier for the upper-level system controller.

11. The anti-sweeping hook system of claim 9, wherein the upper-level system controller is configured to receive data from the computer server.

12. The anti-sweeping hook system of claim 11, wherein the data received from the computer server includes a software update for the upper-level system controller.

13. The anti-sweeping hook system of claim 9, wherein the upper-level system controller is configured to communicate directly with the MCU via the wireless communications module.

14. The anti-sweeping hook system of claim 9, wherein the upper-level system controller includes one or more visual indicators configured to indicate whether the upper-level system controller is receiving power, or transmitting data, or receiving data.

15. The anti-sweeping hook system of claim 1, wherein the MCU is configured to repeat each wireless transmission of inventory data at least once.

16. The anti-sweeping hook of claim 1, further comprising a networked computer server configured to receive and aggregate the inventory data transmitted by the MCU.

17. The anti-sweeping hook system of claim 16, wherein the inventory data is transmitted from the MCU to an upper-level system controller which then transmits the inventory data to the computer server.

18. The anti-sweeping hook system of claim 16, wherein the MCU is configured to transmit the inventory data to an upper-level controller, which is configured to transmit the inventory data via a network link to the computer server.

19. The anti-sweeping hook system of claim 18, wherein communication via the network link comprises communication via the internet, or via an intranet, or via an extranet.

20. A retail inventory management system comprising:
the anti-sweeping hook system of claim 1;
a computer server configured to receive and aggregate the inventory data transmitted by the MCU, the computer server being linked to a network and further configured to send the inventory data to a display of a client device, and wherein the computer server is configured to transmit inventory data to the display, in real-time, such that the display shows the inventory data from a plurality of anti-sweeping hooks.

21. The retail inventory management system of claim 20, wherein the computer server causes the display to show the inventory data both graphically and textually.

22. The retail inventory management system of claim 20, wherein the computer server is configured to transmit inventory data to the display, in real-time, indicating a number of retail items, for a particular SKU, disposed on each anti-sweeping hook in a section of a particular store.

23. The retail inventory management system of claim 20, wherein the computer server is configured to transmit inventory data to the display, in real-time, indicating a number of retail items, for a particular SKU, disposed on one or more anti-sweeping hooks in a particular store.

24. The retail inventory management system of claim 23, wherein the computer server is further configured to transmit inventory data to the display, in real-time, indicating the number of retail items, for a particular SKU, disposed on the one or more anti-sweeping hooks in each store of a plurality of stores.

25. The retail inventory management system of claim 20, wherein the computer server is configured to transmit inventory data to the display, in real-time, indicating the number of retail items, for a plurality of SKUs, disposed on one or more anti-sweeping hooks in a particular store.

26. The retail inventory management system of claim 25, wherein the computer server is further configured to transmit inventory data to the display, in real-time, indicating the number of retail items, a plurality of SKUs, disposed on the one or more anti-sweeping hooks in each store of a plurality of stores.

27. The retail inventory management system of claim 23, wherein the computer server is configured to transmit inventory data to the display, in real-time, indicating a number of backstock items for the particular SKU in the particular store.

28. The retail inventory management system of claim 27, wherein the computer server is further configured to transmit inventory data to the display, in real-time, indicating the number of backstock items for a plurality of SKUs in each store of a plurality of stores.

29. The retail inventory management system of claim 28, wherein the computer server is configured to automatically prompting a user to restock the one or more anti-sweeping hooks using backstock items for one or more SKUs in one or more of the plurality of stores.

30. The retail inventory management system of claim 20, wherein the computer server is configured to transmit inventory data to the display, in real-time, indicating a number of each retail item, for an entire department or category of retail items, disposed on one or more anti-sweeping hooks in a particular store.

31. The retail inventory management system of claim 30, wherein the computer server is configured to transmit inventory data to the display, in real-time, indicating the number of each retail item, for the entire department or category of retail items, disposed on the one or more anti-sweeping hooks in each store of a plurality of stores.

32. The retail inventory management system of claim 20, wherein the computer server is configured to transmit inventory data to the display, in real-time, indicating a number of SKUs which are out-of-stock at a particular store.

33. The retail inventory management system of claim 32, wherein the computer server is configured to transmit inventory data to the display, in real-time, indicating each store of a plurality of stores where at least one SKU is out-of-stock.

34. The retail inventory management system of claim 32, wherein the computer server is configured to automatically generate a purchase order for an out-of-stock SKU, or to automatically generate an alert prompting a user to create the purchase order.

35. The retail inventory management system of claim 20, wherein the computer server is configured to transmit inventory data, simultaneously and in real-time, to a plurality of displays located locally or remotely from the computer server.

36. The retail inventory management system of claim 20, wherein the computer server is configured with multiple levels of access for users, wherein each access level has different privileges associated therewith.

37. The retail inventory management system of claim 20, wherein the client device is one of a desktop computer, a laptop computer, a notebook computer, a tablet computer, a smartphone, or a smartwatch.

38. The retail inventory management system of claim 20, wherein the computer server is configured to calculate and transmit inventory data to the display indicating a rate of inventory usage for one or more SKUs, or for one or more stores.

39. The retail inventory management system of claim 20, wherein the computer server is configured to calculate and transmit inventory data to the display indicating a rate of inventory usage by hour of the day, day of the week, week of the month, or month of the year.

40. The retail inventory management system of claim 39, wherein the computer server is configured to analyze trends in the rate of inventory usage in order to determine when inventory at a particular store is to be replenished.

* * * * *